United States Patent [19]

Ishizuka et al.

[11] Patent Number: 5,479,288
[45] Date of Patent: Dec. 26, 1995

[54] LIGHT TRANSMISSION MODULE

[75] Inventors: Kohei Ishizuka, Machida; Masaya Nakata, Yokohama; Teruhisa Azumaguchi; Junji Takeda, both of Fujisawa; Hiroki Irie, Yokohama; Atushi Miura, Fujisawa; Tamio Takeuchi; Tsutomu Kohno, both of Yokohama; Akisada Moriguchi, Ome, all of Japan

[73] Assignee: Hitachi, Ltd., Tokyo, Japan

[21] Appl. No.: 27,988

[22] Filed: Mar. 8, 1993

[30] Foreign Application Priority Data

May 27, 1992 [JP] Japan ................................. 4-135342

[51] Int. Cl.⁶ ................................................ H04B 10/00
[52] U.S. Cl. ........................ 359/163; 359/162; 359/152; 385/92; 385/94
[58] Field of Search .................................. 359/110, 152, 359/154, 162, 163; 385/24, 92, 94

[56] References Cited

U.S. PATENT DOCUMENTS

| | | | |
|---|---|---|---|
| 4,809,358 | 2/1989 | Ternström | 359/163 |
| 4,809,361 | 2/1989 | Okada et al. | 359/152 |
| 4,989,934 | 2/1991 | Zavracky et al. | 359/152 |
| 5,005,939 | 5/1991 | Arvanitakis et al. | 350/96.2 |
| 5,047,835 | 9/1991 | Chang | 357/74 |
| 5,097,353 | 3/1992 | Fujiwara et al. | 359/197 |
| 5,119,223 | 6/1992 | Panzer et al. | 359/124 |
| 5,122,893 | 6/1992 | Tolbert | 359/152 |
| 5,127,075 | 6/1992 | Althaus et al. | 385/74 |
| 5,268,973 | 12/1993 | Jenevein | 359/163 |
| 5,283,680 | 2/1994 | Okugawa et al. | 359/124 |

FOREIGN PATENT DOCUMENTS

| | | |
|---|---|---|
| 2290102 | 10/1975 | France . |
| 2638079C2 | 8/1976 | Germany . |
| 2712292A1 | 3/1977 | Germany . |
| 3241942C2 | 11/1982 | Germany . |
| 0012451 | 1/1983 | Japan ................ 359/163 |
| 59-180514 | 10/1984 | Japan . |
| 0185131 | 7/1988 | Japan ................ 359/163 |

OTHER PUBLICATIONS

Saeki et al, "Trend of Development of Systems Contributing to Construction and Improvement in Operability of a Transmission Network", NTT Journal 1992.

*Primary Examiner*—Leo H. Boudreau
*Assistant Examiner*—Rafael Bacares
*Attorney, Agent, or Firm*—Antonelli, Terry, Stout & Kraus

[57] ABSTRACT

A light transmission module is disclosed, having a light receiving element module, in which a photodiode and a coupling portion between the photodiode and a first optical fiber are hermetically sealed, and a light emitting element module, in which a laser diode driven by an electric signal and a coupling portion between said laser diode and a second optical fiber are also hermetically sealed. A two-sided print board is provided, on the two sides of which electric circuits for a transmitting system and a receiving system are mounted. The electric circuits for the transmitting and receiving circuits are; isolated electrically from each other, and are sealed in one body by molds, and accommodated in cases, together with the light receiving element module and the light emitting element module.

10 Claims, 15 Drawing Sheets

FIG. 2A(1)
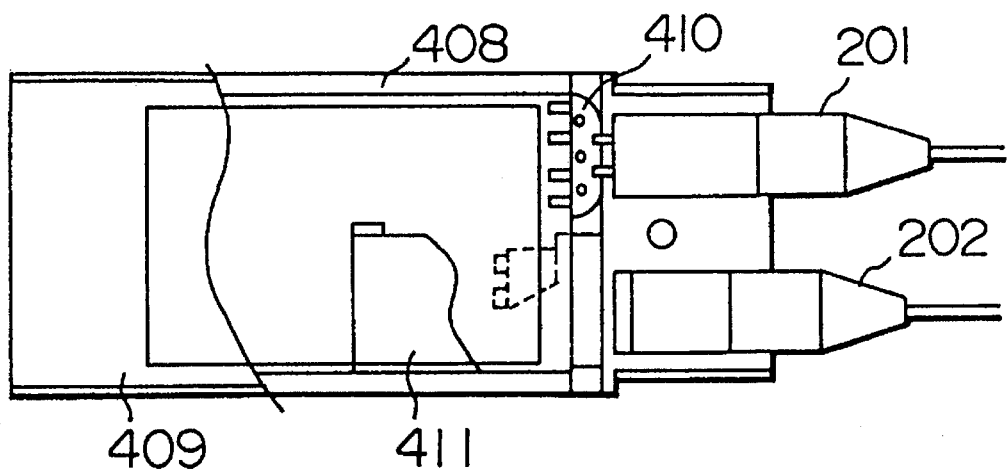
FIG. 2A(2)
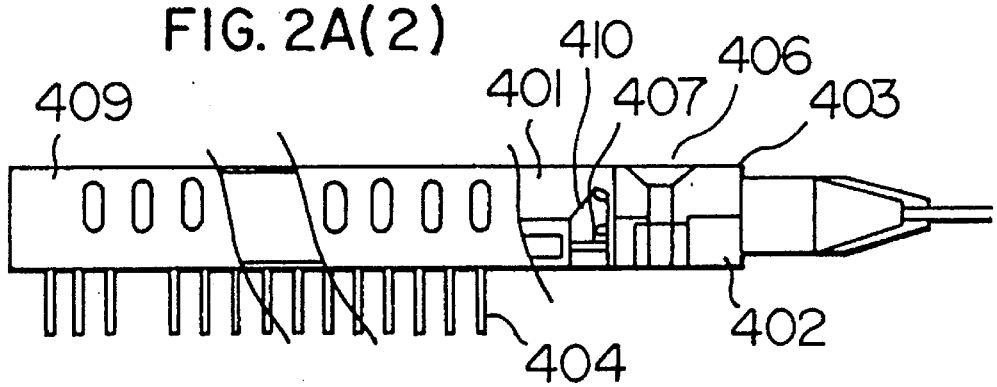
FIG. 2A(3)
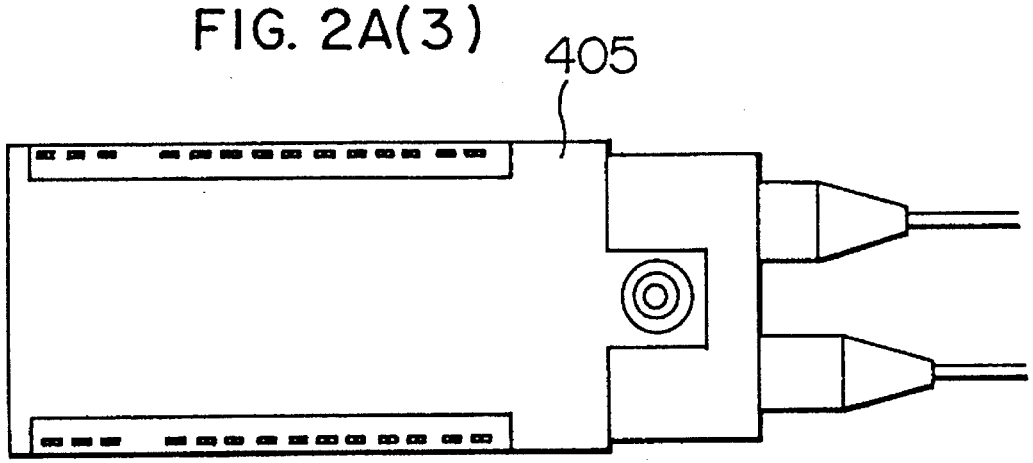

FIG. 8
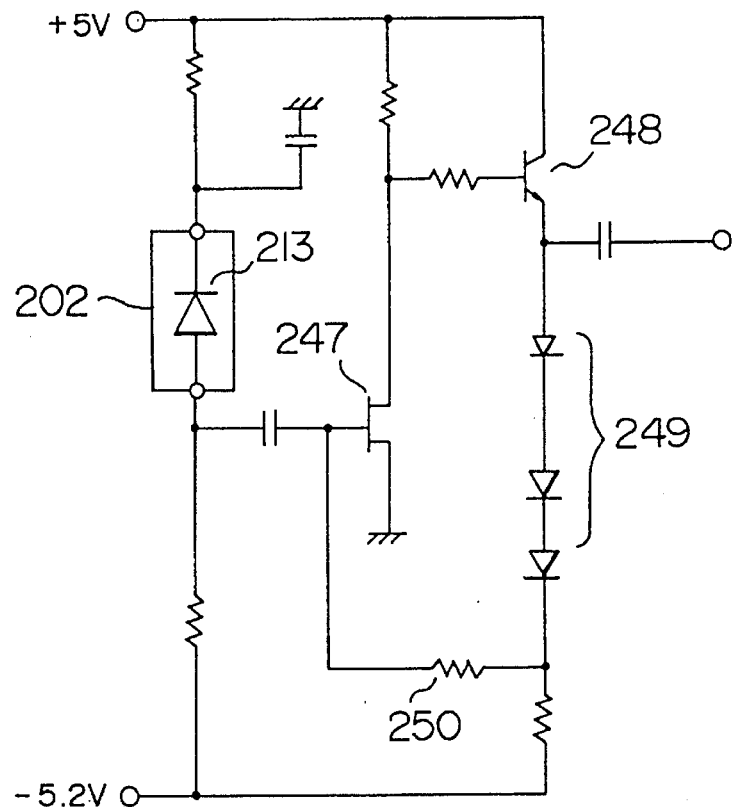
FIG. 11A
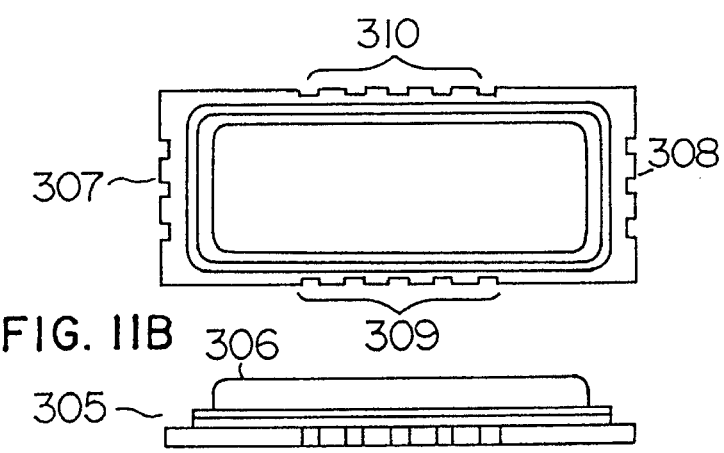
FIG. 11B

SECOND LAYER

THIRD LAYER

FOURTH LAYER

FIFTH LAYER

LIGHT TRANSMISSION MODULE

BACKGROUND OF THE INVENTION

The present invention relates to a transmission device effecting light transmission, and in particular to modules in charge of light transmission and light reception in the transmission device.

Recently, repletion of communication networks has become more and more important with development of the post-industrial society.

Thus, an SDH transmission system, etc. is being introduced, which consists of a new digital hierarchy network composed principally of light transmission paths of 156 Mb/s×n constructed by new synchronized terminal devices having network node interfaces (NNI) in conformity to the CCITT recommendation, described, e.g., in "Trend of development of systems contributing to construction and improvement in operability of a transmission network (in Japanese)" published in the NTT Journal (January 1992), etc.

However, each transmission device used in such systems should have a "multiplexing function" putting a plurality of low speed signals together into a high speed signal, a "cross connect (line path compilation) function" separating and collecting multiplexed signals, a "signal converting function" between a low speed interface and an SDH interface, etc., as indicated in FIGS. 16A to 16C, respectively. In order to realize such a "multiplexing function", a "cross connect (line path compilation) function" and a "signal converting function", each transmission device should be provided with a transmitting circuit effecting transmitting processing including electro-optical converting processing and a receiving circuit effecting receiving processing including opto-electrical converting processing.

Heretofore, a transmitting module, in which such a transmitting circuit is realized in the form of a module, and a receiving module, in which a receiving circuit is realized in the form of a module independently therefrom, have been used in a transmission node.

As a technique relating to this kind of light transmission modules there is known a technique described in JP-A-Sho 59-180514.

SUMMARY OF THE INVENTION

An object of the present invention is to provide a light transmission module capable of being integrated at a high density and having a small size.

Another object of the present invention is to provide a light transmission module capable of reducing cross-talk between the transmitting circuit and the receiving circuit.

Still another object of the present invention is to provide a light transmission module, which is mechanically robust and not deformed by heat produced in the device.

As described previously, heretofore the transmitting circuit and the receiving circuit have been realized in the form of separate modules from the point of view of difficulty in the integration, prevention of leakage of signals from the transmitting circuit to the receiving circuit, etc.

However, if the transmitting module and the receiving module are constructed independently, the scale of the device increases in the transmission device including a number of light transmission paths.

According to the present invention, a light transmission module is provided, which is suitable for down-sizing and in which the transmitting circuit and the receiving circuit are realized in one body in the form of a module, owing to a construction capable of reducing leakage of signals from the transmitting circuit to the receiving circuit.

That is, in order to achieve the above objects, according to the present invention, a light transmission module converting an optical signal received from a receiving optical fiber into received data to output them and inputted data to be transmitted into an optical signal to output it to a transmitting optical fiber is provided, which light transmission module comprises:

(a) a light receiving element module, in which an opto-electrical converting element and a coupling portion between the opto-electrical converting element and a first optical fiber are hermetically sealed;

(b) a light emitting element module, in which a light emitting element driven by an electric signal and a coupling portion between the light emitting element and a second optical fiber are hermetically sealed;

(c) a two-sided print board, on the two sides of which a transmitting circuit driving the light emitting element, responding to the value of the inputted data to be transmitted, and a receiving circuit reproducing received data from the electric signal obtained by conversion by means of the opto-electric converting element to output them are mounted, electrically isolated from each other; and (d) a mold sealing the light receiving element module, the light emitting element module, and the two-sided print board in one body.

In a light transmission module according to the present invention, the opto-electrical converting element and the coupling portion between the opto-electrical converting element and the first optical fiber as well as the light emitting element and the coupling portion between the light emitting element and the second optical fiber are separately hermetically sealed in the form of modules; a transmitting circuit and a receiving circuit are mounted on the two sides of a two-sided print board, electrically isolated from each other; and the light receiving element module, the light emitting element module, and the two-sided print board are brought together in one body.

In this way, it is possible to provide a light transmission module having a small size and capable of preventing cross-talk between the transmitting system and the receiving system.

The mold described above is made of a resin containing glass fiber. The resin containing glass fiber has a high deformation temperature and can prevent deformation of the light transmission module due to heat produced in the device.

Further, it is possible to intend to reduce noise by adopting a grounding plate of solid structure in an internal layer of the print board.

The reduction in the noise can be realized also by arranging a high voltage generating circuit away from the light receiving element module and the light emitting element module.

As described above, according to the present invention, it is possible to provide a light transmission module, which is suitable for high density integration and can reduce cross-talk from the transmitting circuit to the receiving circuit, by realizing the transmitting circuit and the receiving circuit in one body in the form of a module.

BRIEF DESCRIPTION OF THE DRAWINGS

FIGS. 2A(1), 2A(2) and 2A(3) are diagrams for explanation indicating the construction of each of the light transmission modules;

FIG. 8 is a circuit diagram indicating the circuit construction of a preamplifier;

FIGS. 11A and 11B are diagrams for explanation indicating the outer shape of an SAW filter IC;

DESCRIPTION OF THE PREFERRED EMBODIMENTS

Hereinbelow, an embodiment of the light transmission module according to the present invention will be explained.

A transmission device as described above is constructed generally by a so-called frame structure, where a plurality of print boards are arranged side by side in a housing.

The light transmission module according to the present embodiment is a single module comprising a receiving circuit effecting processing including opto-electrical converting processing and a transmitting circuit effecting processing including electro-optical converting processing, and it is mounted on a print board constituting the transmission device.

Figure 1:
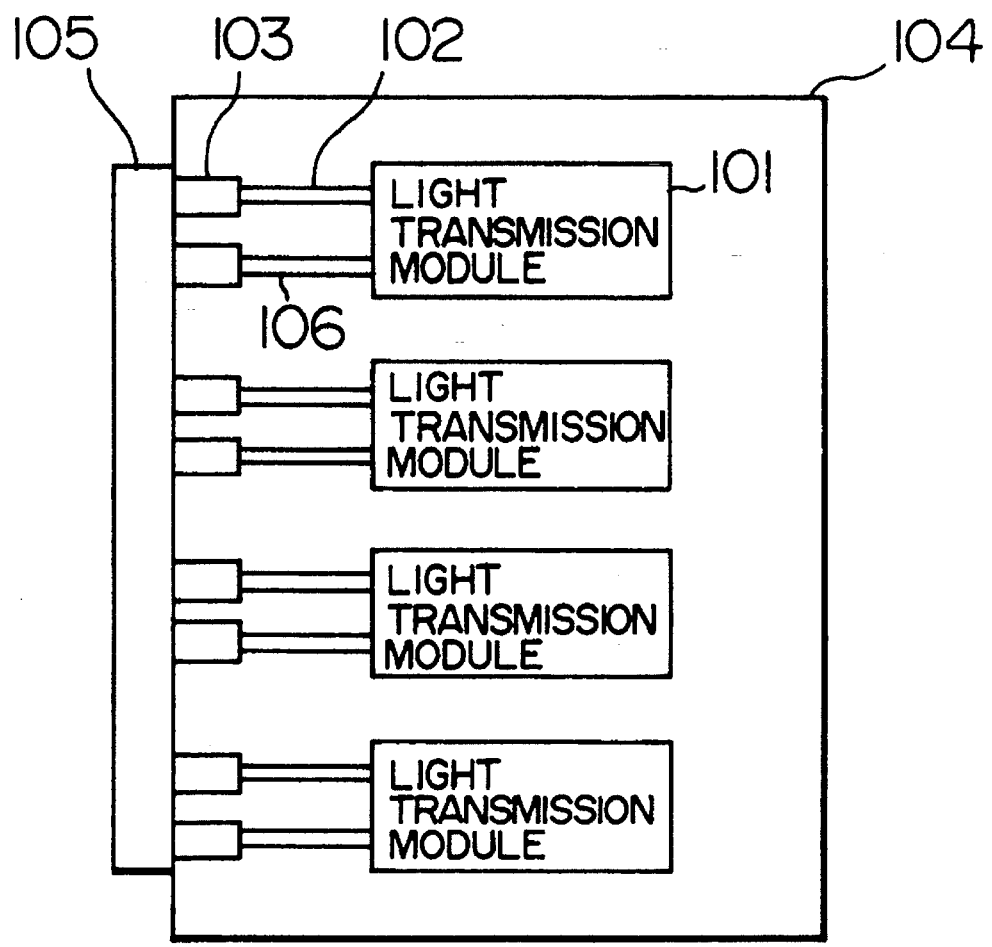
FIG. 1 is a diagram for explaining a print board, on which light transmission modules according to an embodiment of the present invention are mounted.

At first, an example of the mounting of light transmission modules on a print board is indicated in FIG. 1.

In the example indicated in the figure, four (4) light transmission modules are mounted on a print board 104.

In the figure, reference numeral 101 is a light transmission module; 102 is a transmitting optical fiber; 103 is an optical connector; 105 is a connector; and 106 is a receiving optical fiber. A single mode fiber is used for the transmitting optical fiber 102, while a single mode or multimode fiber is used for the receiving optical fiber 106. Further, the light transmission module 101 is connected with wiring on the print board, through which it effects input of data to be transmitted, output of received data, etc. from/to other sections within the device by using electric signals. It is supposed that transmission rates for data dealt with by the light transmission module according to the present embodiment are 52 Mb/s and 156 Mb/s.

As described above, two optical fibers 102 and 106 for transmission and reception are connected with each of the light transmission modules 101 mounted on the print board and the other ends of the optical fibers are equipped with the optical connector 103.

The connector 105 of the print board is one for connection with a backboard on the frame for electric signals including a power supply, in which a space and an insertion hole exclusively used for the optical connector 103 are disposed. The optical connector 103 is inserted into the connector 105 of the print board through this insertion hole and fixed therein, and connected with an optical connector disposed at a corresponding position on the backboard of the frame. As described above, in the present embodiment, the connector 105 acts also as a guide for the optical connector 103. It is possible to increase the mounting density on the print board by using this pig tail method.

Although a device, in which four (4) light transmission modules 101 are mounted, is indicated in FIG. 1, the number of light transmission modules mounted on one print board may be further increased in accordance with a requirement by the device in such an extent that a temperature condition allowed for the print board is satisfied.

Next, a list of external input and output signals to/from each of the light transmission modules is indicated in TABLE 1.

TABLE 1

| | ITEM | FUNCTION |
| --- | --- | --- |
| TRANSMIT-TING SECTION | DATA INPUT | ELECTRIC SIGNAL TO BE OUTPUTTED AS OPTICAL SIGNAL IS INPUTTED |
| | CLOCK INPUT | CLOCK SIGNAL SYNCHRO-NIZED WITH DATA INPUT IS INPUTTED |
| | OPTICAL OUTPUT INTER-RUPT-ING CONTROL | OPTICAL OUTPUT IS FORCEDLY INTERRUPTED |
| | ALARM OUTPUT | ABNORMALITY OF LASER DIODE IS DETECTED |
| | OPTICAL OUTPUT | LIGHT IS TRANSMITTED THROUGH OPTICAL FIBER |
| RECEIVING SECTION | OPTICAL INPUT | OPTICAL SIGNAL IS RECEIVED THROUGH OPTICAL FIBER |
| | DATA OUTPUT | DEMODULATED ELECTRIC SIGNAL IS OUTPUTTED |
| | CLOCK | CLOCK SIGNAL SYNCHRO- |

TABLE 1-continued

| ITEM | FUNCTION |
| --- | --- |
| OUTPUT | NIZED WITH DATA OUTPUT IS OUTPUTTED |
| ALARM OUTPUT | INTERRUPTION OF OPTICAL INPUT IS DETECTED |

In TABLE 1, "light output" of "transmitting section" indicates an optical signal output to the transmitting optical fiber 102, while "light input" of "receiving section" indicates an optical signal input from the receiving optical fiber 106. All the input and output signals other than these two optical signals are electric signals. For example, "data input" of "transmitting section" indicates data inputted in the form of electric signals, which are to be transmitted through the transmitting optical fiber 102, while "data output" of "receiving section" indicates an output of data received from the receiving optical fiber 106, which are converted into electric signals. Further, "optical output interrupting control" of "transmitting section" is an input signal instructing the device to nullify forcedly the optical output to the optical fiber serving as a transmitting transmission path, regardless of presence or absence of "data input". On the other hand, "alarm output" of "transmitting section" indicates a signal outputting an abnormal state detected in the electric power of the light output of a laser diode effecting the electro-optical conversion for outputting the optical signal to the transmitting optical fiber 102 and "alarm output" of "receiving section" indicates an alarm outputted when it is detected that the optical input from the receiving optical fiber 106 is nullified.

Supervising signals further subdivided may be added to these interfaces. On the contrary, a part or all of the supervising signals may be omitted so that the circuit construction of the light transmission module is simplified.

Next, the construction of the light transmission module 101 according to the present embodiment will be discussed with reference to; FIGS. 2A(1) to 2A(3).

As indicated in these figures, the light transmission module includes a case (A) 405, a case (B) 409 (50×25×8 mm$^3$, for example), a mold (A) 402 (length 62.5 mm, for example), a mold (B) 403, a light emitting element module 201, a light receiving element module 202, a circuit print board 401, a shield case (A) 411 and a shield case (B) 407.

The light emitting element module 201, the light receiving element module 202 and the circuit print board 401 are held between the mold (A) 402 and the mold (B) 403. The mold (B) 403 is mounted on the mold (A) 402. The mold (A) 402 is accommodated in the case (A) 405 and the case (B) 409.

This construction will be described below more in detail.

The light emitting element module 201 and the light receiving element module 202 are held by the mold (A) 402 and the mold (B) 403 already formed and worked and secured thereto. That is, in order to reduce the size, the device is so constructed that the light emitting element module 201 and the light receiving element module 202 can be simultaneously fixed by the mold (A) 402 and the mold (B) 403. Further, the mold (A) 402 and the mold (B) 403 are made of insulator so that the cases accommodating the light emitting element module 201 and the light receiving element module 202, respectively, are isolated from each other and in this way production of cross-talk between the different cases is prevented. In addition, by adopting such a construction it is possible to isolate thermally the circuit print board 401 from the light emitting element module 201 and the light receiving element module 202. Since the mold (A) 402 and the mold (B) 403 are formed in accordance with the outer shapes of the light emitting element module 201 and the light receiving element module 202, respectively, rotation or drop out of the light emitting element module 201 and the light receiving element module 202 never takes place.

As indicated in the figure, the mold (A) 402 is so constructed that the part for holding the light emitting element module 201 and the light receiving element module 202 and the part for holding the circuit print board 401 are formed in one body. In this way, it is possible to increase mechanical robustness of the light transmission module 101 and also to prevent displacement between the part for holding the light emitting element module 201 and the light receiving element module 202 and the circuit print board 401. The mold (A) 402 holds the circuit print board 401 at an approximately central position of the module height of 8 mm. As described later, electronic parts are mounted on both the sides of the circuit print board. The central part of the mold (A) 402 is cut away so that parts mounted on the circuit print board 401 are not brought into contact with each other. Further, two rows of lead terminals 404 are mounted on the two sides of the circuit print board 401 perpendicularly to the circuit print board. Holes, through which the lead terminals 404 for the circuit print board 401 are inserted, are formed in the mold (A) 402. The end portions of the mold (A) 402 and the mold (B) 403 are formed in a groove structure so that they engage well with each other.

In the present embodiment, the light emitting element module 201 and the circuit print board 401 are connected with each other through a flexible board 410. By using the flexible board 410 as described above, it is possible to facilitate the mounting and at the same time to reduce the size of the light transmission module.

The light receiving element module 202 is connected directly with the circuit print board 401 by soldering. The light receiving element module 202 and the circuit print board 401 are shielded therebetween by the shield case (B) 407 from the lower side. Further, a protruding pin for fixing the shield case (B) 407 is disposed on the light receiving element module 202 side of the mold (A) 402 and the shield case (B) 407 is fixed by thermally hardening this protruding pin. In the figure, a print board thrusting member 408 thrusts the circuit print board 401 held by the mold (A) 402 from the upper side to fix it. In this way, four corners of the circuit print board 401 are thrusted simultaneously by one member. The central part of the print board thrusting member 408 is cut away so that parts mounted on the circuit print board 401 are not brought into contact with each other and in addition, one side thereof on the side of the light emitting element module 201 and the light receiving element module 202 is cut away. That is, the print board thrusting member 408 is U-shaped with a flat bottom. The shield case (A) 411 and the shield case (B) 407 are disposed for shielding the preamplifier (FIG. 5, reference numeral 215 stated later), which is the part most seriously influenced by outer noise. The shield case (A) 411 is mounted on the circuit print board 401 and the position thereof is fixed by inserting a protruding portion of the shield case (A) 411 into a throughhole formed therein for connecting it with GND. Apart from this, the shield case (A) 411 is connected with the GND pattern on the circuit print board 401 at two points by soldering.

On the other hand, the mold (A) 402 is mounted in the case (A) 405, after the circuit print board 401 has been mounted thereon. A cut and raised portion is formed on the case (A) 405 for connecting it with the GND on the circuit print board 401. Grooves are formed between the mold (A) 402 and the case (A) 405 in order that they are engaged better with each other. Further, a cylindrical hole is formed in the mold (A) 402 so that a stud for fixing a flat head screw 406 can be inserted thereinto. The mold (A) 402 and the case (A) 405 are fixed by using these groove and hole. The hole portion for taking out the lead terminals of the mold (A) 402 is formed so as to protrude slightly from the case (A) 405 so that no solder sticks to the case (A) 405 at soldering the lead terminals.

After the mold (A) 402 has been mounted in the case (A) 405, the case (B) 409 is mounted on the case (A) 405 and fixed thereto by means of the flat head screw 406. Ventilation holes are formed in the side walls of the case (B) 409 in order to improve heat evacuation by convection.

The mold (A) 402, the mold (B) 403 and the print board thrusting member 408 are made of resin including glass fiber in order to increase the mechanical robustness and to raise the productivity.

Figure 2B:
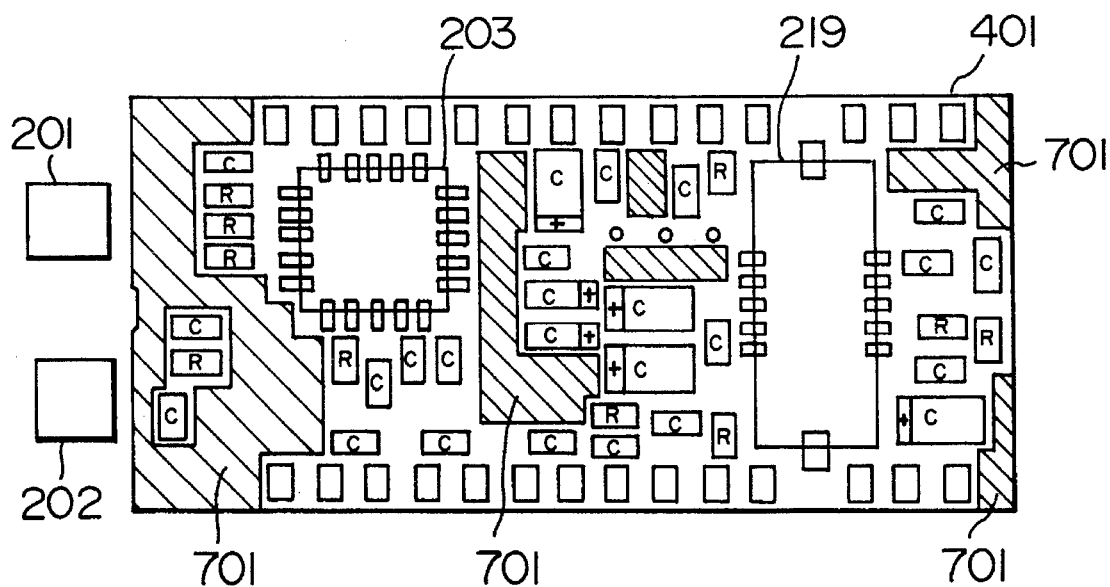
FIGS. 2B and 2C are diagrams for explaining a state of mounting on the print board.

The resin including glass fiber has a very high deformation temperature and can resist a temperature, which is 2.5 times as high as a temperature which resin including no glass fiber can resist. FIG. 2B shows a state of mounting on the rear surface of the circuit print board 401. The mounting density on the rear surface of the circuit print board 401 is high, as indicated in FIG. 2B, and the area, which can be utilized for supporting the circuit print board, is as small as indicated by hatched parts A 701.

Figure 2C:
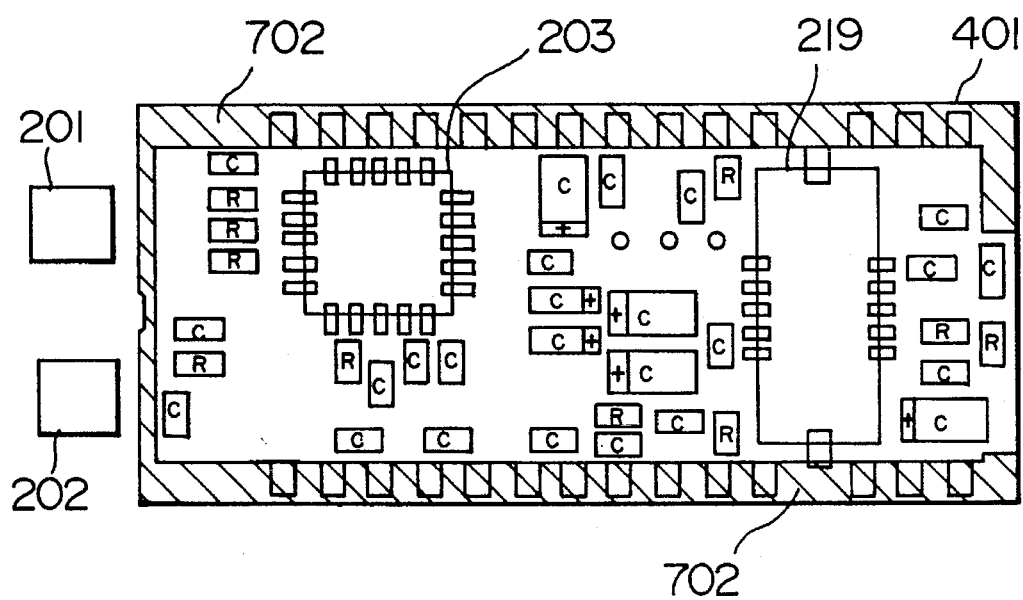

From the point of view of the stability of holding, it is very difficult to hold the circuit print board by using the hatched parts A 701 and it is not possible to secure reliability of the connection with the light emitting element module 201 and the light receiving element module 202. In addition, since the area has a complicated shape, it is not suitable for mass production. Therefore, in the present embodiment, the height of the deformation temperature of the resin including glass fiber, as described previously, is utilized, the part for mounting the lead terminals 404 serves as a holding part, and the circuit print board is held by using a hatched part B 702, as indicated in FIG. 2C.

Figure 3A:
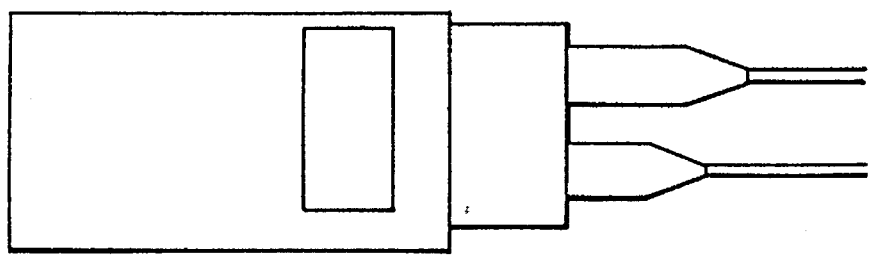
FIGS. 3A, 3B and 3C are three-sided diagrams showing the outer shape of a light transmission module using a photodiode for the light receiving element.
Figure 3B:
Figure 3C:
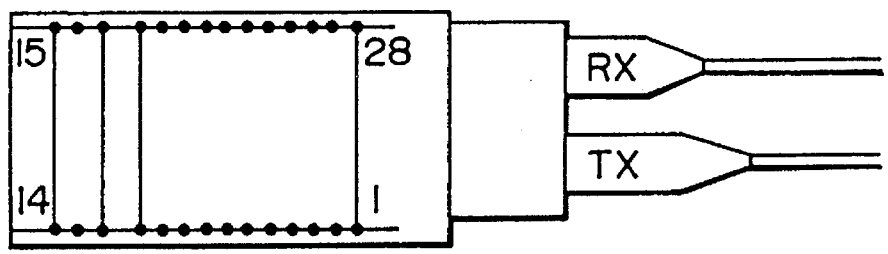

Here, as indicated in the outer shape of the light transmission module in FIGS. 3A to 3C, intervals between pins are integers times as great as 2.54 mm and the pins are arranged so that the light transmission module can be mounted on the circuit print board 104, in which through-holes are formed on an inch mesh. The length of the pins is 3.5 mm±0.5 mm, which is such a size that it is not necessary to cut them, when the light transmission module is mounted on a print board 1.6 mm thick. The volume of a case, in which the circuit print board, on which the light transmission module is mounted, is 10 cc (50×25×8 mm$^3$, for example). The height of the module is 8.5 mm at maximum and no part thereof is brought into contact with a print board inserted in an adjacent location.

As indicated by the pin arrangement in TABLE 2, the pins used for the transmitting system are arranged so as to be completely separated from those used for the receiving system so that pattern formation on the circuit print board 401 is facilitated.

TABLE 2

| PIN | FUNCTION |
|---|---|
| 1 | GROUND OF TRANSMITTING SECTION |
| 2 | GROUND OF TRANSMITTING SECTION |
| 3 | POWER SUPPLY OF TRANSMITTING SECTION |
| 4 | ALARM OUTPUT OF TRANSMITTING SECTION |
| 5 | CLOCK INPUT |
| 6 | DATA INPUT |
| 7 | OPTICAL OUTPUT INTERRUPTING CONTROL |
| 8 | POWER SUPPLY OF RECEIVING SECTION |
| 9 | GROUND OF RECEIVING SECTION |
| 10 | GROUND OF RECEIVING SECTION |
| 11 | POWER SUPPLY OF RECEIVING SECTION |
| 12 | POWER SUPPLY OF RECEIVING SECTION |
| 13 | INVERTED CLOCK OUTPUT |
| 14 | CLOCK OUTPUT |
| 15 | DATA OUTPUT |
| 16 | INVERTED DATA OUTPUT |
| 17 | GROUND OF RECEIVING SECTION |
| 18 | ALARM OUTPUT OF RECEIVING SECTION |
| 19 | POWER SUPPLY OF RECEIVING SECTION |
| 20 | POWER SUPPLY OF RECEIVING SECTION |
| 21 | GROUND OF RECEIVING SECTION |
| 22 | GROUND OF RECEIVING SECTION |
| 23 | GROUND OF RECEIVING SECTION |
| 24 | GROUND OF RECEIVING SECTION |
| 25 | POWER SUPPLY, $V_{CC}$ |
| 26 | GROUND OF RECEIVING SECTION |
| 27 | POWER SUPPLY, $V_{EE3}$ |
| 28 | POWER SUPPLY, $V_{EE3}$ |

FIGS. 3A to 3C and TABLE 2 show a construction in the case where a photodiode is used for the light receiving element for the opto-electric conversion in the light transmission module. However, as an alternative, an avalanche photodiode may be used for the light receiving element.

Figure 4A:
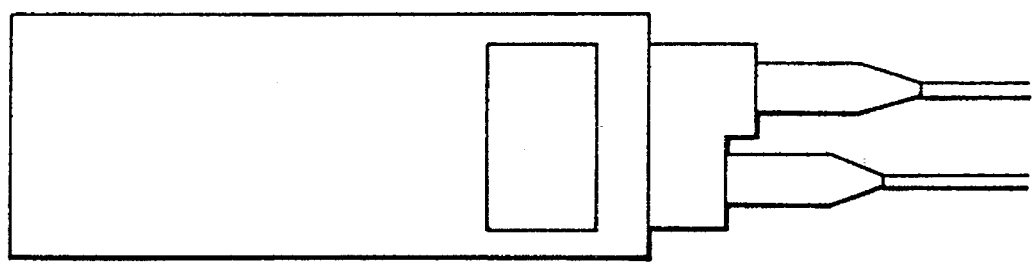
FIGS. 4A, 4B and 4C are three-sided diagrams showing the outer shape of a light transmission module using an avalanche photodiode for the light receiving element.
Figure 4B:
Figure 4C:
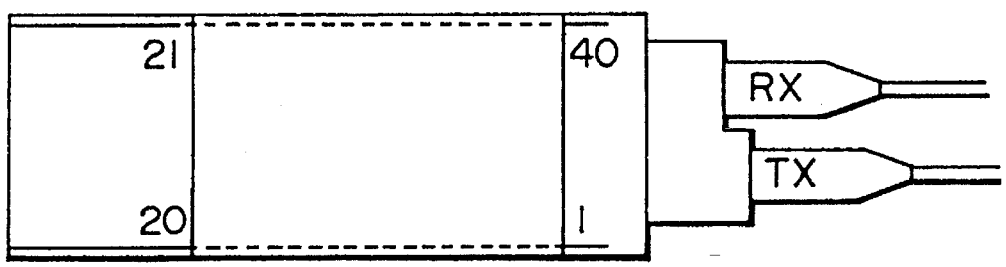

The outer shape of the light transmission module is illustrated in FIG. 4A to 4C and the pin arrangement is indicated in TABLE 3, in the case where an avalanche photodiode is used for the light receiving element.

TABLE 3

| PIN | FUNCTION |
|---|---|
| 1 | GROUND OF TRANSMITTING SECTION |
| 2 | GROUND OF TRANSMITTING SECTION |
| 3 | POWER SUPPLY OF TRANSMITTING SECTION |
| 4 | ALARM OUTPUT OF TRANSMITTING SECTION |
| 5 | CLOCK INPUT |
| 6 | DATA INPUT |
| 7 | OPTICAL OUTPUT INTERRUPTING CONTROL |
| 8 | POWER SUPPLY OF TRANSMITTING SECTION |
| 9 | GROUND OF RECEIVING SECTION |
| 10 | GROUND OF RECEIVING SECTION |
| 11 | GROUND OF RECEIVING SECTION |
| 12 | GROUND OF RECEIVING SECTION |
| 13 | GROUND OF RECEIVING SECTION |
| 14 | GROUND OF RECEIVING SECTION |
| 15 | GROUND OF RECEIVING SECTION |
| 16 | POWER SUPPLY OF RECEIVING SECTION |
| 17 | INVERTED CLOCK OUTPUT |
| 18 | CLOCK OUTPUT |
| 19 | GROUND OF RECEIVING SECTION |
| 20 | POWER SUPPLY OF RECEIVING SECTION |
| 21 | GROUND OF RECEIVING SECTION |
| 22 | POWER SUPPLY OF RECEIVING SECTION |
| 23 | DATA OUTPUT |
| 24 | INVERTED DATA OUTPUT |
| 25 | ALARM OUTPUT OF RECEIVING SECTION |
| 26 | GROUND OF RECEIVING SECTION |
| 27 | GROUND OF RECEIVING SECTION |
| 28 | GROUND OF RECEIVING SECTION |
| 29 | GROUND OF RECEIVING SECTION |
| 30 | POWER SUPPLY OF RECEIVING SECTION |
| 31 | POWER SUPPLY OF RECEIVING SECTION |

TABLE 3-continued

| PIN | FUNCTION |
|---|---|
| 32 | GROUND OF RECEIVING SECTION |
| 33 | GROUND OF RECEIVING SECTION |
| 34 | GROUND OF RECEIVING SECTION |
| 35 | GROUND OF RECEIVING SECTION |
| 36 | GROUND OF RECEIVING SECTION |
| 37 | POWER SUPPLY, $V_{CC}$ |
| 38 | GROUND OF RECEIVING SECTION |
| 39 | POWER SUPPLY, $V_{EE3}$ |
| 40 | POWER SUPPLY, $V_{EE3}$ |

Even in the case where an avalanche photodiode is used for the light receiving element, as indicated in the figure, a volume of 20 cc ($81\times31\times8$ mm$^3$, for example) for the case can be realized.

Next, a circuit construction for the light transmission module 101 will be described with reference to FIG. 5.

As indicated in the figure, the circuit construction of the light transmission module 101 can be roughly divided into a transmitting circuit, which converts electric input signals into optical signals to output them, and a receiving circuit, which receives optical input signals and converts them into electric signals to output them. The transmitting circuit and the receiving circuit work independently from each other.

The transmitting circuit is composed of a laser diode (hereinbelow abbreviated to "LD") 206 converting electric input signals into optical signals to output them to the transmitting optical fiber 102; a monitor photodiode (hereinbelow abbreviated to "monitor PD") 207 monitoring optical output power of the LD 206 to output it; an alarm circuit 208 outputting an optical output interruption alarm signal, in the case where the output of the monitor PD is decreased below a predetermined value; a flipflop 209 for obtaining inner data signals by waveform-shaping the electric signals inputted through a data input 226 by using clocks inputted through a clock input 227; a pulse current control circuit 210 controlling the amplitude of LD driving pulse current; a bias current control circuit 212 receiving the output of the monitor PD 207 and controlling the amplitude of LD driving bias current; and an LD drive circuit 211 receiving the output signal of the flipflop 209, the output of the pulse current control circuit 210, and the output of the bias current control circuit 212 and outputting an LD driving current signal.

Among the above noted elements, the LD 206, the monitor PD 207, the bias current control circuit 212 and the LD drive circuit 211 constitute a negative feedback loop circuit for controlling the bias current so that the optical output power is kept constant.

On the other hand, the receiving circuit is composed of a photodiode 213 converting optical input signals from the receiving optical fiber 106 into electric signals; a preamplifier 215 converting current signals, into which the optical input signals are converted by the photodiode 213, into voltage signals and amplifying them; a variable gain amplifier 216, which amplifies and attenuates the output signal of the preamplifier 215 to a predetermined amplitude; a full-wave rectifying circuit 217 for generating a clock signal component from the output signal of the variable gain amplifier 216; a delaying element 218 for regulating the phase of the output signal of the full-wave rectifying circuit 217; a surface acoustic wave filter 219 (hereinbelow abbreviated to "SAW filter") extracting clock signals from the full-wave rectified signal outputted by the delaying element 218; a limit amplifier 221 for waveform-shaping the output signal of the SAW filter 219 to generate clock pulse signals; a buffer 224 outputting the output of the limit amplifier 221 to the exterior; an alarm circuit 222, which generates a clock interruption alarm signal, when the amplitude of the output signal of the limit amplifier 221 is smaller than a predetermined value, and stops the data of the receiving circuit and the clock signal output; a buffer 225 for outputting the alarm signal to the exterior; a flipflop 220 dividing the output signal of the variable gain amplifier 216 into data pulses having values of "1" and "0" by using output clock pulses of the limit amplifier 221 to reproduce them; and a buffer 223 for outputting the output of the flipflop 220 to the exterior. As described previously, an avalanche photodiode may be used in lieu of the photodiode 213 serving as the light receiving element. Further, in the case where the avalanche photodiode is used, there is disposed an avalanche photodiode control circuit 214, which supervises the output of the variable gain amplifier 216, in order to control the voltage applied to the avalanche photodiode.

Figure 5:
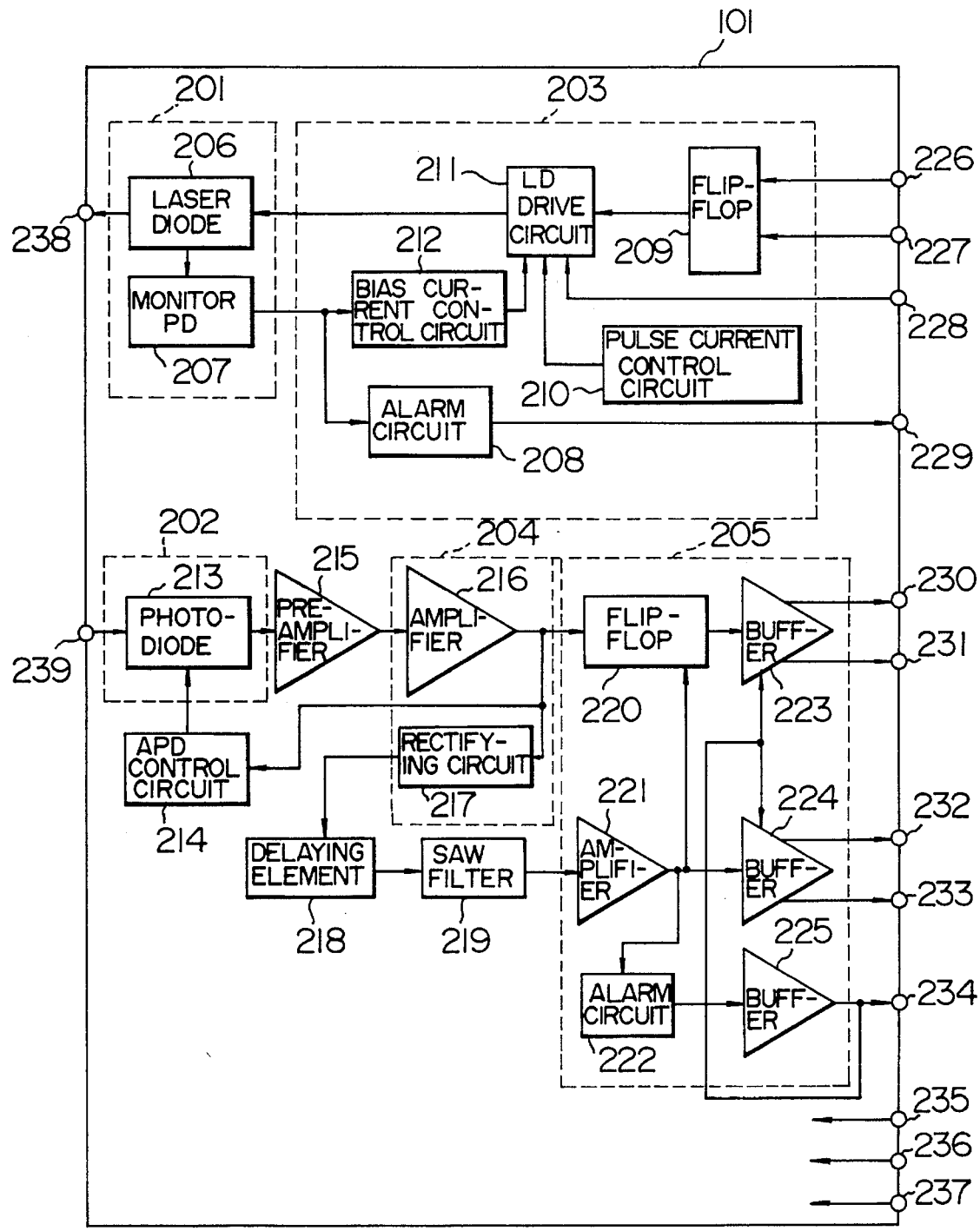
FIG. 5 is a block diagram indicating the circuit construction of the light transmission module.

Next, the construction of parts in the circuit constituting the light transmission module indicated in FIG. 5.

On the side of the transmitting circuit, the light emitting element module 201 described above is formed by sealing hermetically the LD 206 and the monitor PD 207 together with the optical connector, the optical fiber, etc. in one body. The flipflop 209, the pulse current control circuit 210, the alarm circuit 208, the bias current control circuit 212 and the LD drive circuit 211 are formed in one chip as an LD driver circuit IC 203, which is mounted on the circuit print board 401 together with peripheral element parts such as resistors, capacitors, etc.

On the other hand, on the side of the receiving circuit, the photodiode 213 is sealed hermetically to construct the light receiving element module 202. A preamplifier 215 is composed of FETs, bipolar transistors, resistors and capacitors. The variable gain amplifier 216 and the full-wave rectifying circuit 217 are formed in one chip as a variable gain amplifying circuit IC 204. The flipflop 220, the limit amplifier 221, the alarm circuit 222 and the different output buffers 223, 224, 225 are formed in one chip as an identifying and reproducing circuit IC 205 for effecting identification and reproduction. The delaying element 218, the SAW filter 219, the preamplifier 215, the variable gain amplifying circuit IC 204, the identifying and reproducing circuit IC 205 are mounted on the circuit print board 401 together with peripheral element parts such as resistors, capacitors, etc. In the case where an avalanche photodiode is used for the photodiode, an avalanche photodiode control circuit 214 is also mounted on the circuit print board 401. The preamplifier 215 may be either formed in an IC or not mounted on the circuit print board 401 but incorporated in the light receiving element module 202.

It is decided by taking the flow of signals into account, by which the output of the full-wave rectifying circuit 217 is inputted to the limit amplifier 221 through the delaying element 218 and the SAW filter and for the purpose of collecting all the analog circuit portions in one chip of the variable gain amplifying circuit IC 204 that the full-wave rectifying circuit is incorporated not in the identifying and reproducing circuit IC 205 but in the variable gain amplifying circuit IC 204. However, depending on requirements for layout on the circuit print board, the full-wave rectifying circuit 217 may be incorporated in the identifying and reproducing circuit IC 205. Further, it is for the purpose of preventing oscillation by distributing the gain all over the receiving system that the receiving system is constructed so as to be divided into two chips.

The 3 kinds of ICs indicated above can be fabricated by using bipolar process. Superficial mounting on the circuit print board can be effected by mounting them on a 20-pin LCC (Leadless Chip Carrier).

Figure 6A:
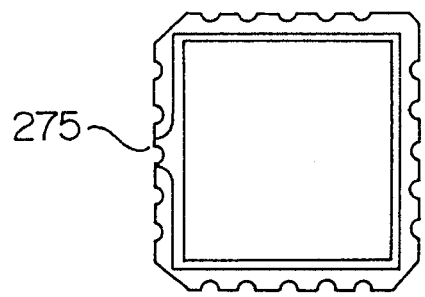
FIGS. 6A and 6B are diagrams for explanation indicating the outer shape of an LCC package used for the light transmission module.
Figure 6B:
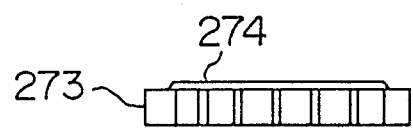

Next, an aspect of the LCC package used in the present embodiment will be discussed with reference to FIGS. 6A and 6B. As indicated in the figure, in the present LCC package, each of the ICs is mounted in a ceramic package (8.89×8.89×1.53 mm$^3$, for example) 273 and the upper surface of the ceramic package 273 is sealed hermetically by using a metallic cap 274. Therefore, by use of each of the LCC packages, it is possible to secure satisfactory reliability of the IC in the relevant package. Since the metallic cap 274 is connected with the GND terminal 275, it has a shielding effect and thus neither the ICs are influenced from the exterior nor it gives the exterior influences of noise.

Hereinbelow, different parts will be explained in greater detail.

Figure 7:
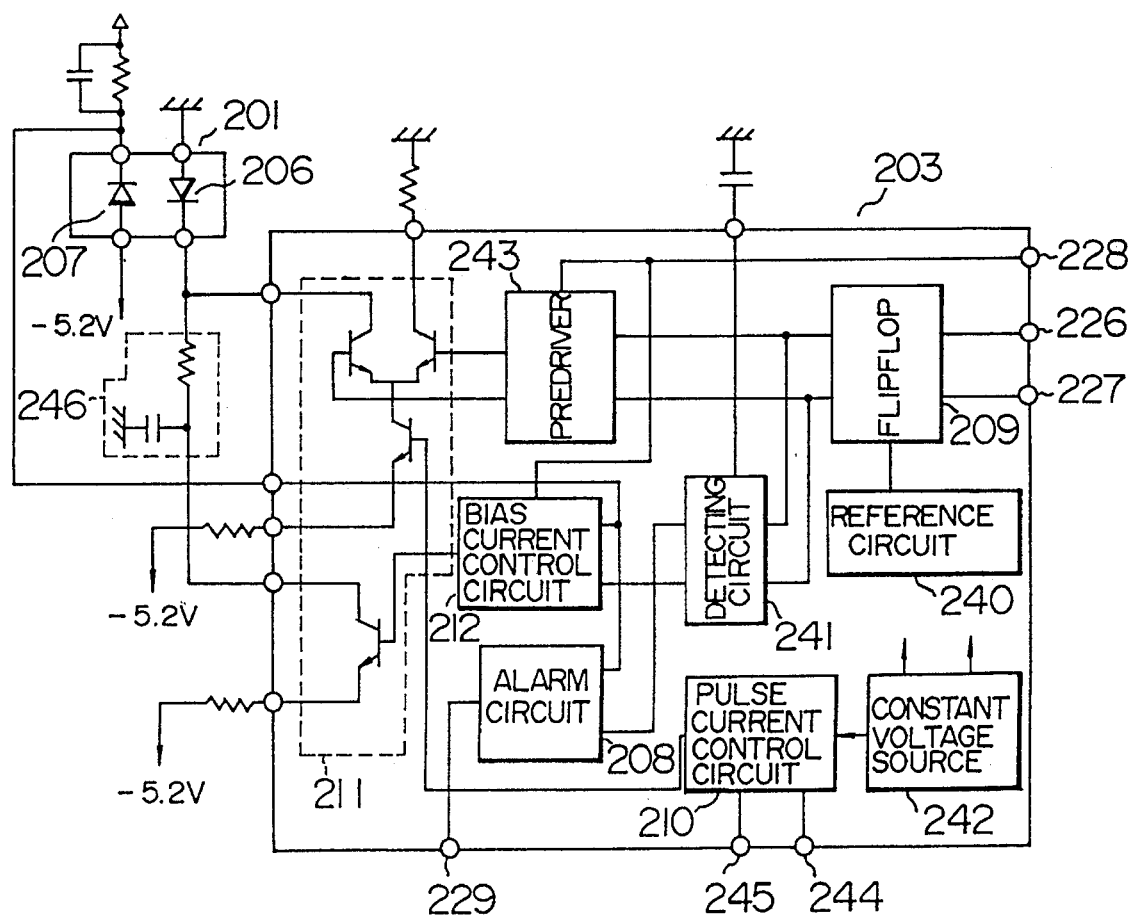
FIG. 7 is a block diagram indicating the circuit construction of an LD driver circuit IC.

At first, a detailed circuit construction of the LD driver circuit IC 203 is indicated in FIG. 7.

As explained, referring to FIG. 5, the LD driver circuit IC 203 comprises the alarm circuit 208 outputting an optical output interruption alarm signal, in the case where the output of the monitor PD is decreased below a predetermined value; the flipflop 209 for obtaining internal data signals by waveform-shaping the electric signals inputted through the data input 226 by using clocks inputted through the clock input 227; the pulse current control circuit 210 controlling the amplitude of LD driving pulse current; and the bias current control circuit 212 receiving the output of the monitor PD 207 and controlling the amplitude of LD driving bias current.

Further, as indicated in FIG. 7, it includes a data input 226; a reference circuit 240 generating a reference voltage for the clock input 227; and a mark ratio (ratio of high level to low level) detecting circuit 241 controlling the alarm circuit 208 and the bias current control circuit 212 so that the bias of the LD and the alarm are not varied, depending on the mark ratio of the data input. In FIG. 7, the pulse current control circuit 210 is a circuit for compensating characteristics of the LD and varies compensating characteristics by connecting resistors with control terminals 244 and 245. A predriver 243 is an amplifying circuit at a stage preceding the LD drive circuit 211. A constant voltage source 242 supplies a constant voltage to the different circuits in the LD driver circuit IC 203. Further, a ringing regulating circuit 246 regulates light output waveform so as to obtain the optimum light output waveform corresponding to the transmission speed. As indicated in the figure, the only externally attached parts necessary for the LD driver circuit IC are resistors and capacitors.

Next, a detailed construction of the preamplifier 215 is indicated in FIG. 8.

FIG. 8 shows a case where the photodiode 213 is used. The preamplifier is constructed by a transimpedance type amplifier consisting of an FET 247, a bipolar transistor 248, a level shift circuit 249 and a feedback resistor 250. A feature of this construction consists in that an FET is used in the input stage and that it is of transimpedance type. In this way, it is possible to intend to reduce noise and to obtain an amplifier 215 performing a stable amplifying operation, suitable for mass production. If the FET or the whole preamplifier is incorporated in the light receiving module 202, it is possible to decrease input capacitance of the FET 247 and to increase the reception sensitivity.

Figure 9:
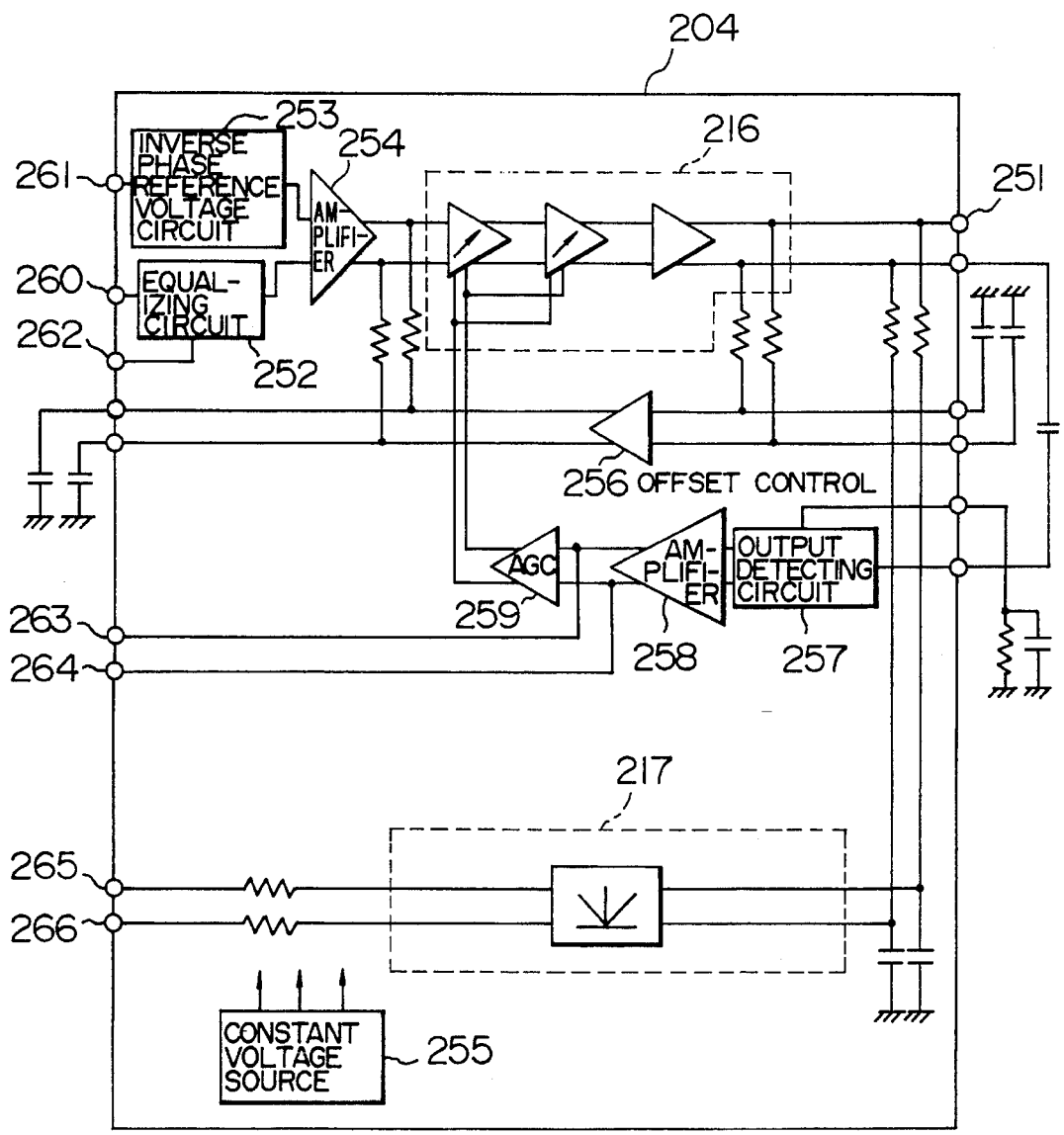
FIG. 9 is a circuit diagram indicating the circuit construction of a variable gain amplifying circuit IC.

Next, a detailed construction of the variable gain amplifying circuit IC 204 is indicated in FIG. 9.

In the variable gain amplifying circuit IC 204, the input from the preamplifier 215 is inputted to an equalizing circuit 252 through an input terminal 260. The equalizing circuit 25 compensates frequency characteristics of the preamplifier 215. It performs a compensating operation by using capacitors, etc. connected with a terminal 262. An inverse reference voltage circuit 253 generates a reference voltage by the same construction as the equalizing circuit 252 in order to balance the circuit. The output of the equalizing circuit 252 is inputted to the variable gain amplifier 216 through a limiter amplifier 254. The variable gain amplifier 216 is composed of three stages, in which the first two stages perform variable amplification, while the last performs a fixed amplification.

An output amplitude detecting circuit 257 detects peak values of the output amplitude of the variable gain amplifier 216. An error amplifier 258 and an AGC control circuit 259 controls the gain of the variable gain amplifier 216, depending to detected peak values thus detected, so that the output of the variable gain amplifier 216 is at a predetermined level. Further, since the variable gain amplifier 216 has a high gain, in the present embodiment, it is intended to stabilize the system by means of a negative feedback to the variable gain amplifier 216 by using an offset control circuit 256. A constant voltage source 255 supplies a constant voltage to the different circuits in the variable gain amplifying circuit IC 204.

In this arrangement, the output of the variable gain amplifier can be taken out through the output terminal 251. Further, the clock signal component in the output of the variable gain amplifier 216 is taken out through output terminals 265 and 266 through the full-wave rectifying circuit 217. On the other hand, in the case where an avalanche photodiode is used for the photodiode 213, the output of the error amplifier 258 is taken out through output terminals 263 and 264 and used for controlling the avalanche photodiode. The only externally attached parts required by the variable gain amplifying circuit IC 204 are resistors and capacitors, and no active elements such as transistors, diodes, etc. are required.

Figure 10:
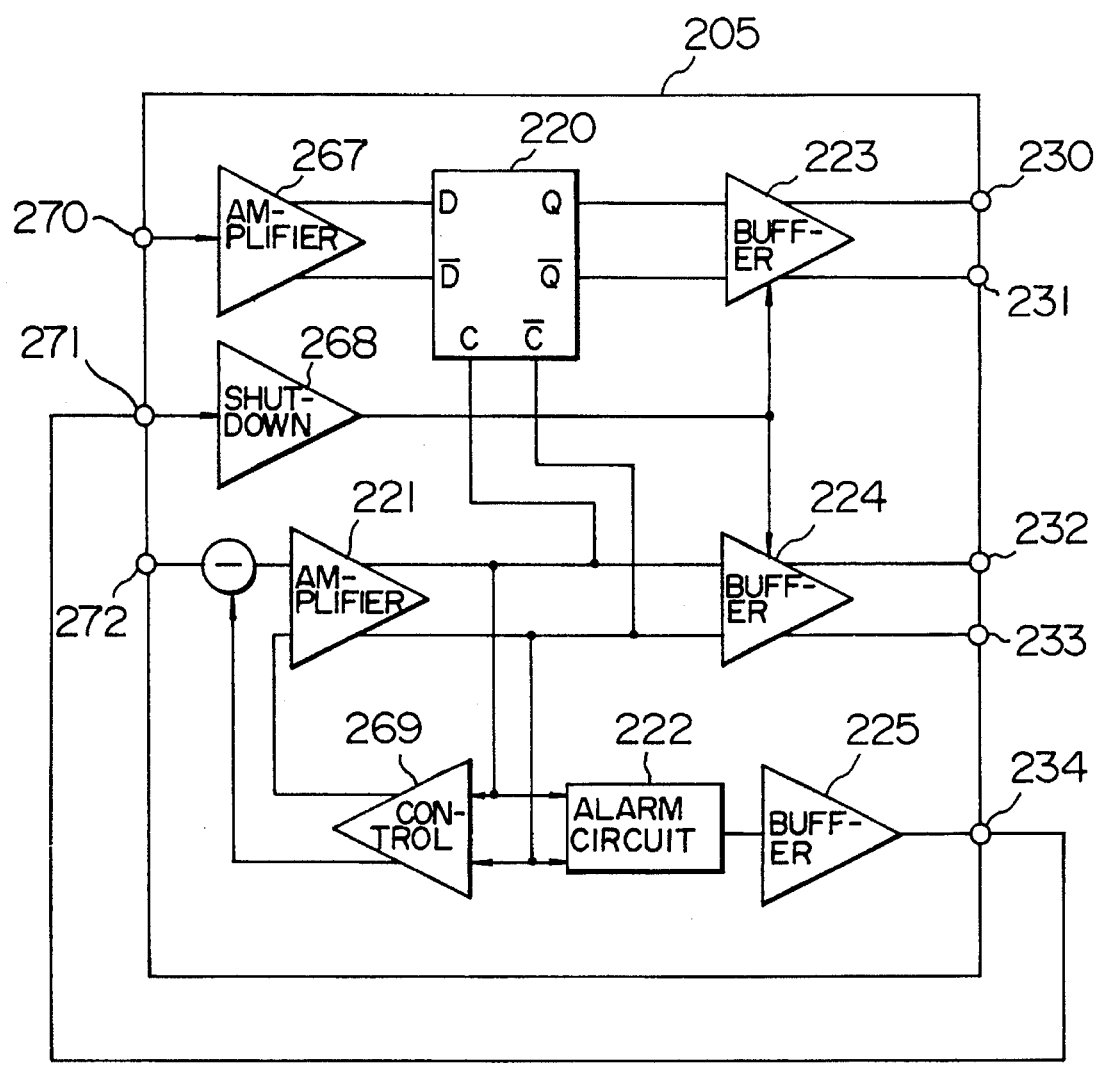
FIG. 10 is a circuit diagram indicating the circuit construction of an identifying and reproducing circuit IC.

Next, a detailed construction of the identifying and reproducing circuit IC 205 is indicated in FIG. 10.

In the identifying and reproducing circuit IC 205, reference numeral 220 is the flipflop indicated in FIG. 5; 221 is a limit amplifier; 222 is an alarm circuit; 223, 224 and 225 are output buffers. Input data from the output terminal 251 of the variable gain amplifying circuit IC 204 are inputted through an input terminal 270 and inputted to the flipflop 220 through a slice amplifier 267. An output control signal is inputted through an input terminal 271 and inputted to a shut-down circuit 268. Usually, the alarm output terminal 234 is connected with an input terminal 271. An offset control circuit 269 compensates offset of the limit amplifier 221. The clock output from the SAW filter 219 is connected with an input terminal 272. In the present identifying and reproducing circuit IC 205, phase matching between the data outputs 230 and 231 and the clock outputs 232 and 233 is effected within the IC. That is, each of the output buffers 223 and 224 is composed of a plurality of stages of differential amplifiers so that the number of internal stages of output buffers for the clock is greater than the number of internal stages of output buffers for the data by a number corresponding to the delay of the output in the flipflop 220. For this reason, in the present embodiment, the phase matching by externally attached delay elements, which was necessary heretofore, is unnecessary. Further, since all the input and output signals are differential, the system is so constructed that leakage of signals through the power supply can be cancelled. Also, it is possible to realize a stable operation with respect to small variations in the optical input by having the alarm circuit 222 have hysteresis characteristics. Since the alarm circuit and the output buffer are incorporated in the identifying and reproducing circuit IC 205, parts to be externally attached are only resistors and capacitors.

Next, an example of the package of the SAW filter 219 is indicated in FIGS. 11A and 11B.

A superficial mounting type ceramic package (16.7×7.3× 2.0 $mm^3$, for example) 305 is adopted for the SAW filter 219. This is for the purpose of facilitating the circuit mounting and reducing the size. The height of parts in the SAW filter 219 is 2 mm, which is a same order of magnitude as that of usual capacitors, resistors, IC, etc. and there is no limitation in the mounting by the height of the parts. The input terminal 307 and the output terminal 308 for the signals are formed on the sides, which are opposite to each other in the longitudinal direction, and arranged along the flow of signals. 309 and 310 represent GND terminals. The upper surface of the ceramic package 305 is hermetically sealed by a metallic cap. In this way, reliability is secured by this package alone. Since the metallic cap 306 is connected with the GND terminals 309 and 310, it has a shielding effect. Therefore, neither the circuits are influenced by noise from the exterior nor they give the exterior influences of noise.

Since the circuits for 52 Mb/s and those for 156 Mb/s can be mounted in a same package, it is not necessary the change circuit print boards, depending on the transmission speed. Further, the SAW filter 219 can be used with input and output impedance matching of 50 $\Omega$. For this reason, the pattern design for the circuit print board is easy, and the SAW filter 219 can be measured alone easily by means of standard instruments.

Next, the mounting of the different parts on the circuit print board 401 will be explained.

Figure 12A:
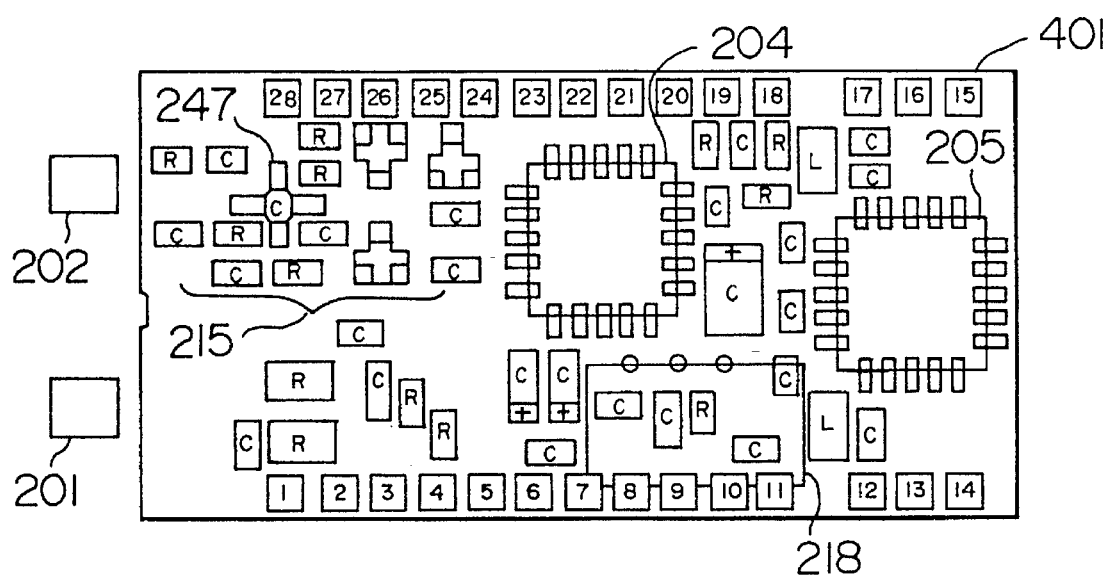
FIGS. 12A and 12B are diagrams for explanation indicating a state of mounting on the front surface of the print board.
Figure 12B:
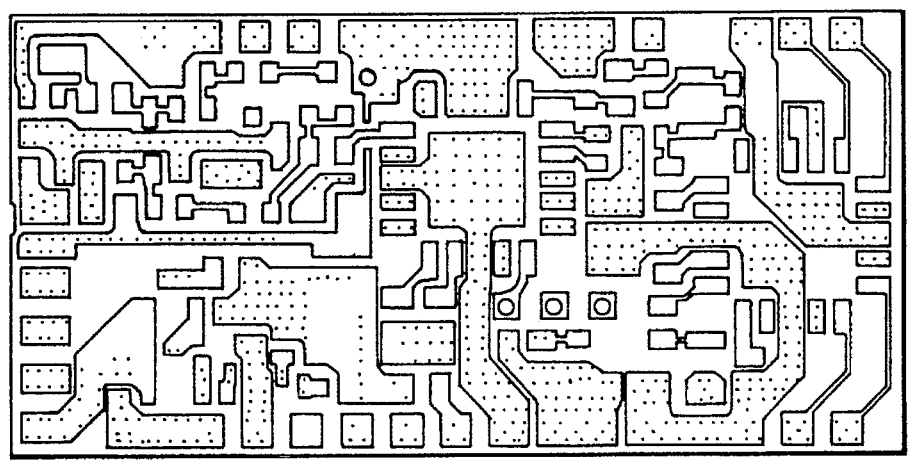
Figure 13A:
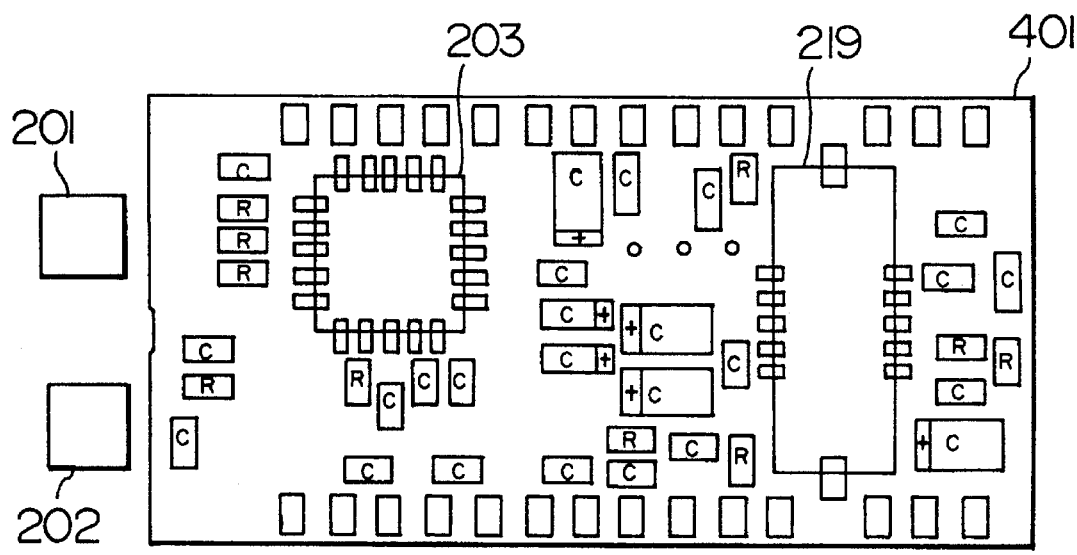
FIGS. 13A and 13B are diagrams for explanation indicating a state of mounting on the rear surface of the print board.
Figure 13B:
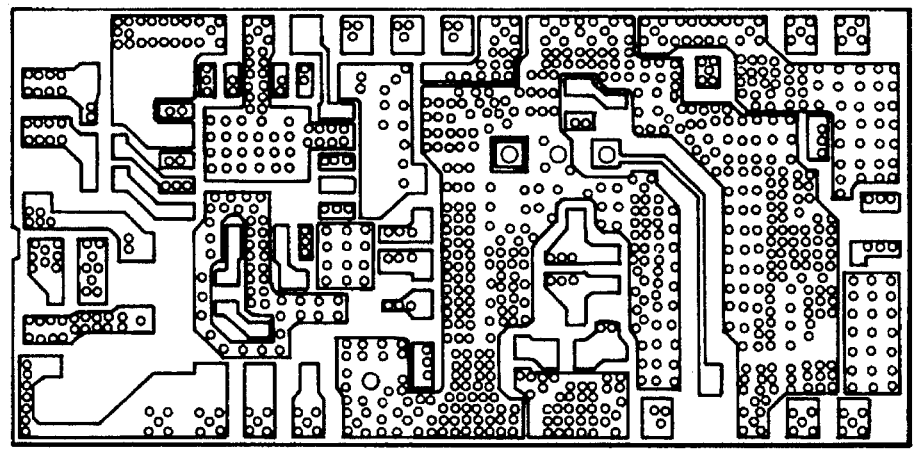

The state of mounting on the front surface of the circuit print board is indicated in FIGS. 12A and 12B, while that on the rear surface thereof is indicated in FIGS. 13A and 13B. FIGS. 12A and 13A show arrangement of parts, while FIGS. 12B and 13B show an aspect of wiring. In the part arrangement diagrams indicated in FIGS. 12A and 13A, R, C, L, Q and D represent a resistor, a capacitor, an inductance, a transistor and a diode, respectively. In addition, a mark ○ on the print board pattern indicates a conduction with an internal layer.

As described above, in the present embodiment, the transmitting section and the receiving section are mounted on one circuit print board 401 in order to reduce the size and to decrease the number of mounting steps. A ceramic print board, in which viaholes conducting only to an internal layer can be formed, is used for the circuit print board 401 in order to enable a high density mounting. Outer dimensions of the ceramic print board is 22.6 mm×46.0 mm and it is 1.2 mm thick. The transmitting section and the receiving section are electrically isolated.

Since gains of the variable gain amplifying circuit IC 204 and the identifying and reproducing circuit IC 205 are high, isolation between the input and the output for each amplifier should be high. Therefore, in the LCC package indicated in FIG. 6 and the SAW filter indicated in FIG. 11, the isolation between the input and the output and the isolation between wirings should be high. Therefore, in the present embodiment, the circuit print board 401 consists of 6 layers. Internal layer patterns and parts mounted on each surface by superficial mounting are connected through viaholes. The GND and power supply patterns are arranged on internal layers in order to intend to reduce impedance. Further, in order to prevent radiation noise, i.e. cross-talk, to the utmost, those signal lines through which signals having great amplitudes pass are arranged on internal layers and covered by the GND and power supply patterns.

The circuits belonging to the transmitting section occupy about ¼ of the whole surface of the circuit print board 401 and they are so arranged that the connection thereof with the light emitting element module 201 is shortest. The GND and the power supply of the transmitting system and the receiving system are completely isolated on the internal layers and they are constructed with wirings having large cross-sections, i.e. of solid structure, in order to reduce the impedance. Owing to the solid structure, a large area of the surface of the circuit print board can be grounded. As the whole, the layout is so designed that the main signal system of the receiving section and the DC signal system of the transmitting section are mounted on the front surface of the circuit print board, while the main signal system of the transmitting section and the DC signal system of the receiving section are mounted on the rear surface thereof.

Figure 17A:
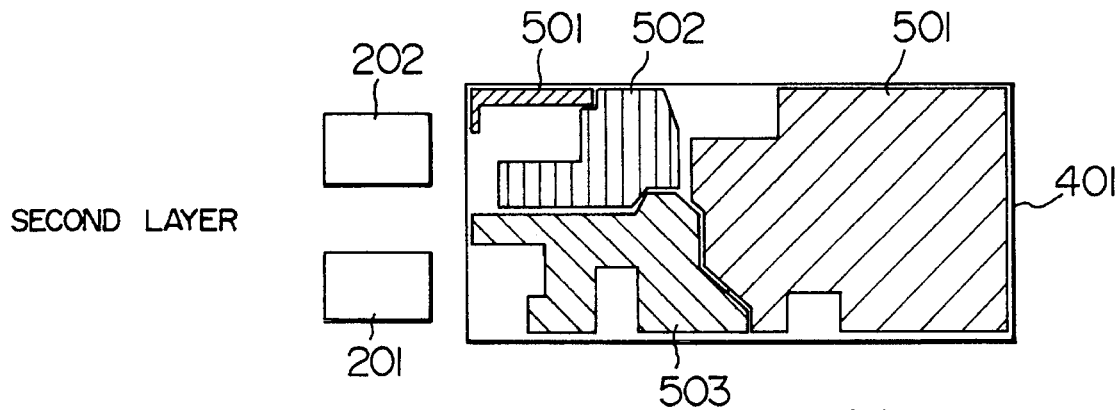
FIGS. 17A to 17D are diagrams for explaining the construction of internal layers in the print board.
Figure 17B:
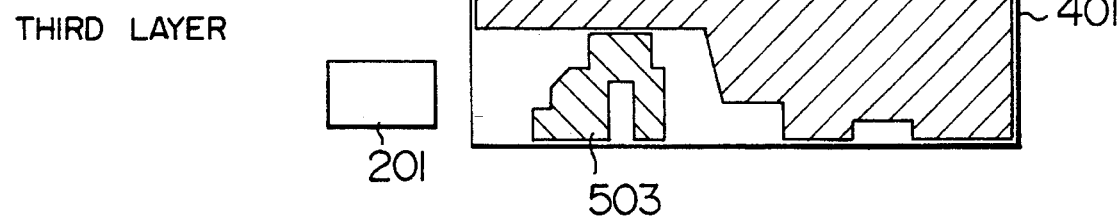
Figure 17C:
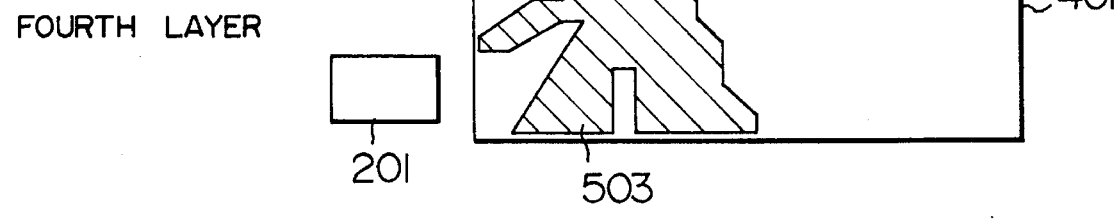
Figure 17D:
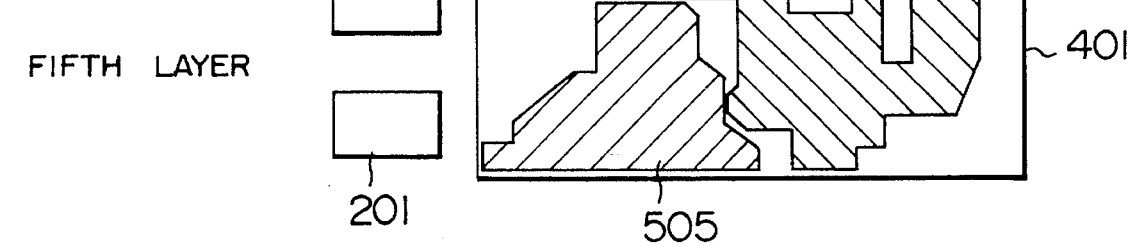

FIG. 17A to 17B show the solid structure of the patterns on the internal layers of the circuit print board.

The arrangement of the power supply and the GND, separated on the internal layers, has been determined, taking following points into account.

The first point is to reduce radiation noise produced by the LD driving pulse current switching the LD. The LD driving pulse current switching the LD flows through a flexible print board 410 between the circuit print board 401 and the light emitting element module 201. In this way, radiation noise, which is a factor of lowering the reception sensitivity, is produced by the flexible print board 410. Therefore, in order to reduce this radiation noise, the flexible print board 410, i.e. the GND layer (503) of the transmitting system connected with the anode terminal of the LD is formed by solid wiring from the second to the fourth layer to intend to reduce impedance.

The second point is measures for preventing oscillation of the amplifiers mounted in the LCC package indicated in FIG. 6. In order to have a high isolation between the input and the output of each of the amplifiers and to reduce noise input and output to/from the metallic cap of the LCC package, there are disposed solid layers 501 and 502 for the power supply of the receiving system on the side of the first layer, on which the variable gain amplifying circuit IC 204 and the identifying and reproducing circuit IC 205 are mounted, i.e. on the second layer. On the other hand, a solid layer 505 is disposed for the power supply of the transmitting system on the side of the sixth layer, on which the LD driver circuit IC 203 is mounted, i.e. on the fifth layer. Further, for the isolation of the SAW filter, there is disposed a solid layer 504 for the GND of the receiving system on the fifth layer from the point of view identical to that described above.

The present embodiment shows the arrangement of wiring on the internal layers at an operation with negative power supply and at an operation with positive power supply it is possible to secure an isolation similar to that obtained in the present embodiment by inverting the power supplying layer and the GND layer.

The mounting is effected in a hybrid mounting and on both the sides in order to reduce the size of the circuit print board 401. Parts for superficial mounting, which are small, are used for almost all the parts. Since the LD driver circuit IC, the variable gain amplifying circuit IC 204, the identifying and reproducing circuit IC 205 and the SAW filter 219 are single parts, which are hermetically sealed independently from each other, the mounting of the parts can be effected only by a solder reflow step. Further, since the IC packages and the package for the SAW filter are made of a ceramic material, which is the same material as the circuit print board 401, they have a same thermal expansion coefficient and thus reliability against heat is satisfactorily secured. Since ceramic is a material having a high thermal conductivity, it can be expected to reduce increase in resistance due to heat by heat evacuation. Still further, in the present embodiment, all the lead terminals connecting the light transmission module 101 with the circuit print board 104 are at the GND potential except for the necessary power supply and signal terminals so that heat is evacuated to the print board 104. The circuit print board 401 is divided into 3 regions having almost equal areas and each of the 3 kinds of ICs consuming high electric power, which produce therefore considerable heat, is located in each of the regions in order to eliminate non-uniform temperature distribution.

Lead terminals, which can be stuck afterwards, are used for the lead terminals for connecting the light transmission module 101 with the circuit print board 104. Patterns for a plurality of circuit print boards 401 are formed on a same board and divided into separated circuit print boards, after the parts have been mounted automatically thereon. Each of the circuit print boards 401 is fabricated by sticking lead terminals on each of the circuit print boards 401 obtained by this division. In this way, it is possible to fabricate it automatically with a high mounting efficiency and to intend to decrease the number of mounting steps. The connecting lead terminals are stuck on the circuit print board 401 so as to extend in the direction perpendicular thereto. The parts used for 52 Mb/s and those used for 156 Mb/s have same shapes so that the circuit print board 401 can be used therefore in common.

As indicated in the figure, the preamplifier 215, the variable gain amplifying circuit IC 204 and the identifying and reproducing circuit IC 205 are mounted on a same surface so that the shortest wiring for the main signal is possible. The SAW filter 219 is mounted on the rear surface of the identifying and reproducing circuit IC 205 and the extracted clock signal output pattern is connected with the identifying and reproducing circuit IC 205 on the shortest path through viaholes. Terminals connecting the light transmission module with the exterior are not disposed in the neighborhood of the input and the output terminal of the SAW filter 219 in order to prevent mixing of noise in the SAW filter 219.

Connection of the preamplifier 215 with the light receiving element module 202 is effected also so as to be on the shortest path. The part of the preamplifier 215 amplifying small signals-has a double shield structure so as to prevent mixing of radiation noise. No internal layer pattern is used for the preamplifier 215 in order to reduce parasitic capacitance having significant influences on noise production to the utmost.

Here, if the light emitting element module 201 and the light receiving element module 202 were mounted closely to each other in order to increase the mounting density on the circuit print board 104, it would be inevitably necessary to mount the preamplifier 215 and the LD driver circuit IC 203 closely to each other. However, since it is not desirable to arrange them closely to each other, the LD driver circuit IC 203 is mounted on a surface different from the surface, on which the preamplifier 215 is mounted. Further, the LD driver circuit IC 203 and the light emitting element module 201 are wired on the shortest path by using internal layers.

Cross-talk due to radiation noise and leakage noise from the power supply is prevented by connecting the cases for the light emitting element module 201 and the light receiving element module 202 with the GND for the transmitting section and the receiving section, respectively.

Interference between data signals and clock signal is reduced, and jitter is decreased, by locating output pins distant from each other for the data output 230, the inverse phase data output 231, the clock output 232 and the inverse phase clock output 233 inputted and outputted to/from the circuit print board 401. This is valid also for the arrangement of the input and output pins in the identifying and reproducing circuit IC 205.

Although a case where a photodiode is used for the light receiving element in the light receiving element module 202 has been explained above, referring to FIGS. 12A, 12B, 13A and 13B, an avalanche photodiode control circuit 214 may be added on the circuit print board 401, in the case where an avalanche photodiode is used therefor.

Here, a high voltage generating circuit applying a high voltage to the avalanche photodiode is included in the avalanche photodiode control circuit 214. This high voltage generating circuit is a circuit utilizing a switching operation of transistors, which produce noise at the switching operation.

Figure 18:
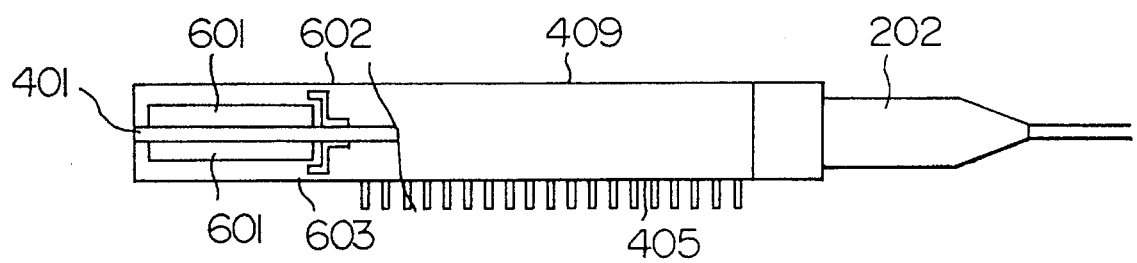
FIG. 18 is a diagram for explaining a state of mounting of a high voltage generating circuit in the light transmission module.
Figure 19:
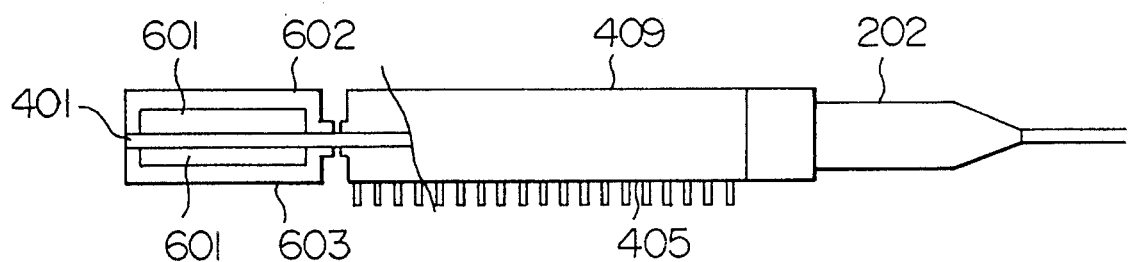
FIG. 19 is a diagram for explaining a light transmission module having a structure divided into two parts.
Figure 16A:
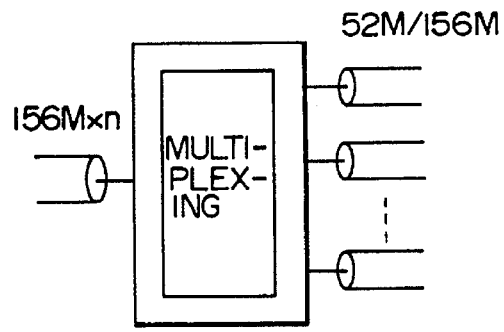
FIGS. 16A to 16C are diagrams for explanation indicating functions of a transmission device.
Figure 16B:
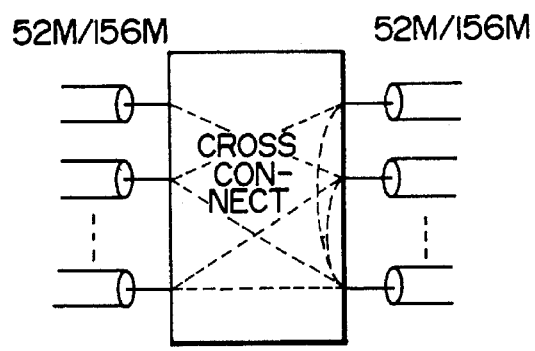
Figure 16C:
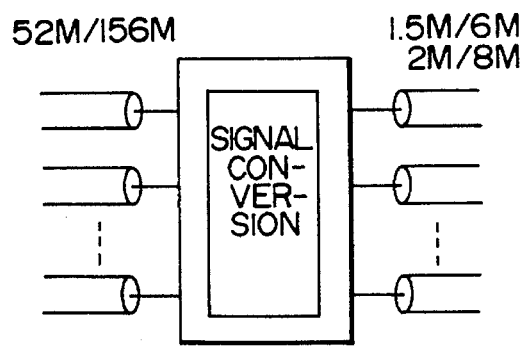

Therefore, in the present embodiment, the high voltage generating circuit 601 is mounted at the position most distant from the light receiving element module 202, as indicated in FIG. 18, in order to suppress lowering in the receiving sensitivity due to radiation noise of the high voltage generating circuit. In addition, a shielding plate A 602 and a shielding plate B 603 are mounted on the circuit print board 401 in order to suppress radiation noise. The internal layers in the circuit print board 401 is divided into 3 systems, i.e. the transmitting system, the receiving system and the high voltage generating circuit system. The shielding plate A 602 and the shielding plate B 603 are mounted by soldering them to a solid GND layer for the high voltage generating circuit system. Although, in the present embodiment, in order to increase mass productivity, a one-body-type constructing method is adopted together with the case A 405 and the case B 409 and isolation is effected by using the shielding plate A 602 and the shielding plate B 603, a constructing method, by which the high voltage generating circuit section and the transmitting and receiving system are divided into two, as indicated in FIG. 19, may be used instead thereof.

Although the explanation has been made above taking the light receiving element module as an example, an effect similar to that described above can be obtained also for the light emitting element module.

Next, the light emitting element module 201 and the light receiving element module 202 will be explained below more in detail.

Figure 14:
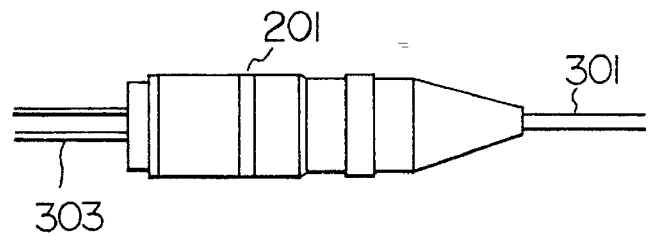
FIG. 14 is a diagram for explanation indicating an aspect of a light emitting element module.
Figure 15:
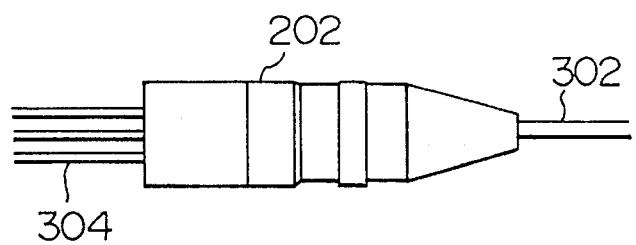
FIG. 15 is a diagram for explanation indicating an aspect of a light receiving element module.

FIG. 14 shows an aspect of the light emitting element module 201, while FIG. 15 indicates an aspect of the light receiving element module 202.

As indicated in the figures, in the present embodiment, the packages for the light emitting element module 201 and the light receiving element module 202 are cylindrical in order to realize down-sizing. The diameter of a cylindrical part is 6.5 mm. The laser diode 206 and the monitor photodiode 207 are mounted in the light emitting element module 201 and optical signals are transmitted to the exterior through the transmitting optical fiber 301. The photodiode or avalanche photodiode 213 is mounted in the light receiving element module 202, which converts optical signals inputted through the receiving optical fiber 302 into electric signals.

The light emitting element module 201 and the light receiving element module 202 are hermetically sealed and reliability can be secured by these parts alone. Further, the packages for the light emitting element module 201 and the light receiving element module 202 are made of metal and in addition connected with the lead pins 303 and 304, respectively, so as to obtain a shielding effect. Therefore, they are not influenced by noise from the exterior.

Finally a, mounting procedure of the light transmission module will be explained.

In FIG. 12A, the mold (A) 402 fixed to the shield case (B) 407, the circuit print board 401, on which electronic circuit parts and the lead terminals 404 are mounted and the case (A) 405 are combined. Next the light receiving element module 202 is mounted on the circuit print board 401 by soldering and the light emitting element module 201 is mounted on the circuit print board 401 through the flexible board 410.

Thereafter, the shield case (A) 411 is mounted and fixed by soldering so as to cover the lead terminals of the preamplifier 215 and the light receiving element module 202. At this time, the shield case (A) 411 and the shield case (B) 407 are coupled with each other so that the preamplifier 215 is perfectly shielded and that radiation noise from the adjacent light emitting element module 201 is intercepted.

Then, the cut and raised part of the case (A) 405 is bent and soldered to the shield case (A) 411 mounted on the circuit print board 401. Thereafter, the mold (B) 403, the print board thrusting member 408 and the case (B) 409 are mounted on the circuit print board 401 and secured thereto by means of flat head screws 406 8 mm long.

We claim:

1. A light transmission module comprising:
   a first optical fiber for receiving a first optical signal from the exterior of the light transmission module;
   a second optical fiber for transmitting a second optical signal to the exterior;
   an opto-electric converting element connected with said first optical fiber for converting said first optical signal into a received electric signal;
   a light receiving element module for accommodating said opto-electric converting element and sealing hermetically a connecting portion between said opto-electric converting element and said first optical fiber;
   a receiving circuit for reproducing received data from said received electric signal and for outputting said reproduced received data;
   a transmitting circuit for converting data to be transmitted into an electric signal to be transmitted;
   a light emitting element connected with said second optical fiber and driven by said transmitting circuit for converting said electric signal to be transmitted into said second optical signal;
   a light emitting element module for accommodating said light emitting element and sealing hermetically a connecting portion between said light emitting element and said second optical fiber;
   a circuit print board, on which said receiving circuit and said transmitting circuit are mounted, isolated electrically from each other; and
   a mold for sealing said light receiving element module, said light emitting element module and said circuit print board in one body, wherein said receiving circuit comprises:
   an amplifying circuit IC for amplifying said received electric signal to output an amplified electric signal;
   a surface acoustic wave filter for extracting a clock component from said amplified electric signal outputted by said amplifying circuit IC; and
   an identifying and reproducing circuit IC for converting said amplified electric signal outputted from said amplifying circuit IC into said received data with a timing of said clock component extracted by said surface acoustic wave filter.

2. A light transmission module converting an optical signal received from a receiving optical fiber into a received electric signal to output it and converting an inputted electric signal to be transmitted into an optical signal to output it to a transmitting optical fiber, comprising:
   (a) a light receiving element module, in which a photodiode and a coupling portion between said photodiode and said receiving optical fiber are hermetically sealed;
   (b) a light emitting element module, in which a laser diode driven by an electric signal and a coupling portion between said laser diode and said transmitting optical fiber are hermetically sealed;
   (c) a two-sided print board, on the two sides of which are mounted a transmitting circuit IC driving said laser diode, responding to a value of inputted data from said inputted electric signal to be transmitted, an amplifying circuit IC amplifying the received electric signal obtained by conversion by means of said photodiode to output an amplified electric signal, a surface acoustic wave filter chip for extracting a clock component from said amplified electric signal outputted by said amplifying circuit IC, and an identifying and reproducing circuit IC for identifying an electric signal obtained by conversion by means of said photodiode with a timing of said clock component extracted by said surface acoustic wave filter chip to reproduce and output received data; and
   (d) a mold sealing said light receiving element module, said light emitting element module, and said two-sided print board in one body.

3. A light transmission module converting an optical signal received from a receiving optical fiber into a received electric signal to output it and converting an inputted electric signal to be transmitted into an optical signal to output it to a transmitting optical fiber, comprising:
   (a) a light receiving element module, in which an avalanche photodiode converting an inputted optical signal into an electric signal, depending on a voltage applied thereto, and a coupling portion between said avalanche photodiode and said receiving optical fiber are hermetically sealed;
   (b) a light emitting element module, in which a laser diode driven by an electric signal and a coupling portion between said laser diode and said transmitting optical fiber are hermetically sealed;
   (c) a two-sided print board, on the two sides of which are mounted a transmitting circuit IC driving said laser diode, responding to a value of inputted data from said inputted electric signal to be transmitted, an amplifying circuit IC amplifying the received electric signal obtained by conversion by means of said avalanche photodiode to output an amplified electric signal, a surface acoustic wave filter chip for extracting a clock component from said amplified electric signal outputted by said amplifying circuit IC, and an identifying and reproducing circuit IC for identifying an electric signal obtained by conversion by means of said avalanche photodiode with a timing of said clock component extracted by said surface acoustic wave filter chip to reproduce and output received data, and an avalanche photodiode control circuit controlling a voltage applied to said avalanche photodiode, responding to the amplified electric signal outputted by said amplifying circuit; and (d) a mold sealing said light receiving element module, said light emitting element module, and said two-sided print board in one body.

4. A light transmission module converting an optical signal received from a receiving optical fiber into a received electric signal to output it and converting an inputted electric signal to be transmitted into an optical signal to output it to a transmitting optical fiber, comprising:

(a) a light receiving element module, in which an opto-electrical converting element and a coupling portion between said opto-electrical converting element and said receiving optical fiber are hermetically sealed;

(b) a light emitting element module, in which a light emitting element driven by an electric signal and a coupling portion between said light emitting element and said transmitting Optical fiber are hermetically sealed;

(c) a two-sided print board, on the two sides of which are mounted a transmitting circuit driving said light emitting element, responding to a value of inputted data from said inputted electric signal to be transmitted, and a receiving circuit reproducing and outputting received data from the received electric signal obtained by conversion by means of said opto-electric converting element, wherein said transmitting circuit and said receiving circuit are electrically isolated from each other on said two-side print board; and (d) a mold sealing said light receiving element module, said light emitting element module, and said two-sided print board in one body;

wherein said mold is comprised of resin.

5. A light transmission module according to claim 2, wherein said mold is comprised of resin.

6. A light transmission module according to claim 3, wherein said mold is comprised of resin.

7. A light transmission module comprising:

a first optical fiber for receiving a first optical signal from the exterior of the light transmission module;

a second optical fiber for transmitting a second optical signal to the exterior;

an opto-electric converting element connected with said first optical fiber for converting said first optical signal into a received electric signal;

a receiving circuit for reproducing received data from said received electric signal and for outputting said reproduced received data;

a transmitting circuit for converting data to be transmitted into an electric signal to be transmitted;

a light emitting element connected with said second optical fiber and driven by said transmitting circuit for converting said electric signal to be transmitted into said second optical signal;

a circuit print board, on which said receiving circuit and said transmitting circuit are mounted; and means for decreasing cross-talk between said receiving circuit and said transmitting circuit, said means comprising said light receiving element module including means for hermetically sealing a connecting portion between said opto-electric converting element and said first optical fiber, said light emitting element module including means for hermetically sealing a connecting portion between said light emitting element and said second optical fiber, said circuit print board including means for electrically isolating said receiving circuit and said transmitting circuit from one another, and a mold for sealing said light receiving element module, said light emitting element module and said circuit board in one body, wherein said receiving circuit comprises:

an amplifying circuit IC for amplifying said received electric signal to output an amplified electric signal;

a surface acoustic wave filter for extracting a clock component from said amplified electric signal outputted by said amplifying circuit IC; and an identifying and reproducing circuit IC for converting said amplified electric signal outputted from said amplifying circuit IC into said received data with a timing of said clock component extracted by said surface acoustic wave filter.

8. A light transmission module comprising:

a first optical fiber for receiving a first optical signal from the exterior of the light transmission module;

a second optical fiber for transmitting a second optical signal to the exterior;

an opto-electric converting element connected with said first optical fiber for converting said first optical signal into a received electric signal;

a receiving circuit for reproducing received data from said received electric signal and for outputting said reproduced received data;

a transmitting circuit for converting data to be transmitted into an electric signal to be transmitted;

a light emitting element connected with said second optical fiber and driven by said transmitting circuit for converting said electric signal to be transmitted into said second optical signal;

a circuit print board, on which said receiving circuit and said transmitting circuit are mounted; and means for decreasing cross-talk between said receiving circuit and said transmitting circuit, said means comprising said light receiving element module including means for hermetically sealing a connecting portion between said opto-electric converting element and said first optical fiber, said light emitting element module including means for hermetically sealing a connecting portion between said light emitting element and said second optical fiber, said circuit print board including means for electrically isolating said receiving circuit and said transmitting circuit from one another, and a mold for sealing said light receiving element module, said light emitting element module and said circuit board in one body;

wherein said mold is made of resin including glass fiber.

9. A light transmission module according to claim 1, wherein said mold is comprised of resin.

10. A light transmission module according to claim 7, wherein said mold is made of resin including glass fiber.

* * * * *